US012812608B2

(12) United States Patent
Liu et al.

(10) Patent No.: US 12,812,608 B2
(45) Date of Patent: Nov. 24, 2026

(54) RESOURCE MULTIPLEXING METHOD AND APPARATUS

(71) Applicant: HUAWEI TECHNOLOGIES CO., LTD., Shenzhen (CN)

(72) Inventors: Fengwei Liu, Chengdu (CN); Shitong Yuan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 564 days.

(21) Appl. No.: 17/986,501

(22) Filed: Nov. 14, 2022

(65) Prior Publication Data

US 2023/0076450 A1 Mar. 9, 2023

Related U.S. Application Data

(63) Continuation of application No. PCT/CN2021/092640, filed on May 10, 2021.

(30) Foreign Application Priority Data

May 15, 2020 (CN) ........................ 202010414384.7

(51) Int. Cl.
*H04W 72/0446* (2023.01)
*H04W 72/23* (2023.01)
*H04W 88/06* (2009.01)

(52) U.S. Cl.
CPC ....... *H04W 72/0446* (2013.01); *H04W 72/23* (2023.01); *H04W 88/06* (2013.01)

(58) Field of Classification Search
CPC ............. H04W 72/0446; H04W 72/23; H04W 88/06; H04W 84/047; H04W 84/0447;
(Continued)

(56) References Cited

U.S. PATENT DOCUMENTS 11,751,177 B2 * 9/2023 You ........................ H04W 72/12 370/329
12,425,998 B2 * 9/2025 You ................... H04W 56/0015
(Continued)

FOREIGN PATENT DOCUMENTS

| | | | |
|---|---|---|---|
| CN | 110475336 | A | 11/2019 |
| EP | 4145907 | A1 | 3/2023 |
| WO | 2019194661 | A1 | 10/2019 |

OTHER PUBLICATIONS

Huawei et al., "R1-1910051: Resource multiplexing between backhaul and access in IAB", 3GPP TSG RAN WG1 Meeting #98bis,Oct. 20, 2019, total 8 pages.
(Continued)

*Primary Examiner* — Marcus Smith
*Assistant Examiner* — Raenita Ann Fenner

(57) ABSTRACT

A resource multiplexing method and apparatus are disclosed. According to the resource multiplexing method, a first node receives first configuration information sent by a second node, where the first configuration information includes first guard interval information associated with a first timing mode of a mobile termination (MT) of the second node. The first node receives second configuration information sent by the second node, where the second configuration information includes second guard interval information associated with a second timing mode of the MT. Guard interval information configured by the second node is associated with different timing modes, so that the first node can obtain the guard interval information corresponding to the different timing modes, to improve flexibility of resource multiplexing performed on an access link and a backhaul link.

21 Claims, 13 Drawing Sheets

(58) Field of Classification Search
CPC .............. H04B 7/15542; H04L 5/0037; H04L 5/0091; H04L 5/22
See application file for complete search history.

(56) References Cited

U.S. PATENT DOCUMENTS

| | | | | |
|---|---|---|---|---|
| 12,426,017 | B2 * | 9/2025 | You | H04L 27/2602 |
| 2012/0069793 | A1 | 3/2012 | Chung et al. | |
| 2021/0058926 | A1 * | 2/2021 | Li | H04W 72/0446 |
| 2021/0212070 | A1 * | 7/2021 | Luo | H04W 72/1263 |
| 2021/0227544 | A1 * | 7/2021 | Luo | H04B 7/022 |
| 2022/0264565 | A1 * | 8/2022 | Huang | H04W 72/27 |
| 2024/0357670 | A1 * | 10/2024 | Maya | H04W 76/10 |

OTHER PUBLICATIONS

Huawei et al., “R1-1911856: Resource multiplexing between backhaul and access in IAB”, 3GPP TSG RAN WG1 Meeting #99, Nov. 22, 2019, total 7 pages.
CMCC, “R1-1912533: Discussion on resource multiplexing among backhaul and access links”, 3GPP TSG RAN WG1 #99, Nov. 22, 2019, total 9 pages.
3GPP TS 38.211 V16.1.0 (Mar. 2020), 3rd Generation Partnership Project; Technical Specification Group Radio Access Network; NR; Physical channels and modulation (Release 16), 130 pages.
3GPP TS 38.212 V16.1.0 (Mar. 2020), 3rd Generation Partnership Project; Technical Specification Group Radio Access Network; NR; Multiplexing and channel coding (Release 16), 146 pages.
3GPP TS 38.213 V16.1.0 (Mar. 2020), 3rd Generation Partnership Project; Technical Specification Group Radio Access Network; NR; Physical layer procedures for control (Release 16), 156 pages.
3GPP TS 38.321 V16.0.0:“3rd Generation Partnership Project; Technical Specification Group Radio Access Network; NR;Medium Access Control (MAC) protocol specification (Release 16)”, Mar. 2020, total 151 pages.
3GPP TS 38.133 V16.3.0:“3rd Generation Partnership Project; Technical Specification Group Radio Access Network; NR;Requirements for support of radio resource management (Release 16)”, Mar. 2020, total 1159 pages.
3GPP TS 38.331 V16.1.0 (Jul. 2020), 3rd Generation Partnership Project; Technical Specification Group Radio Access Network; NR;Radio Resource Control (RRC) protocol specification(Release 16), 835 pages.
3GPP TS 38.306 V16.0.0 (Mar. 2020), 3rd Generation Partnership Project; Technical Specification Group Radio Access Network; NR; User Equipment (UE) radio access capabilities (Release 16), total 64 pages.
International Search Report and Written Opinion issued in PCT/CN2021/092640, dated Aug. 11, 2021, 9 pages.
3GPP TS 38.214 V16.1.0 (Mar. 2020), 3rd Generation Partnership Project; Technical Specification Group Radio Access Network; NR; Physical layer procedures for data(Release 16), 151 pages.
3GPP TR 38.874 V16.0.0 (Dec. 2018), 3rd Generation Partnership Project; Technical Specification Group Radio Access Network; NR; Study on Integrated Access and Backhaul;(Release 16), 111 pages.
Huawei, HiSilicon, Resource multiplexing between backhaul and access in IAB. 3GPP TSG RAN WG1 Meeting #96bis, Xi’an, China, Apr. 8-12, 2019, R1-1903938, 12 pages.
LG Electronics, Remaining details on IAB resource multiplexing. 3GPP TSG RAN WG1 #100bis, e-Meeting, Apr. 20, 30, 2020, R1-2001952, 7 pages.
Huawei, HiSilicon, TP for Guard Symbols MAC Ces. 3GPP TSG-RAN WG2 Meeting #109 electronic, Feb. 24--Mar. 6, 2020, R2-2000528, 8 pages.
Office Action issued in JP2022-569211, dated Nov. 28, 2023 with English translation, 6 pages.
3GPP TSG-RAN WG2 Meeting #108 Reno, USA, R2-1915324, Signalling for IAB timing, Nokia, Nokia Shanghai Bell, Nov. 18-22, 2019,total 3 pages.
3GPP TSG-RAN WG4 Meeting#94-e E-meeting, R4-2000976,switching time for IAB DU and MT,ZTE Corporation, Feb. 24-Mar. 6, 2020, total 7 pages.
Samsung, Switching time between IAB-MT and IAB-DU. 3GPP TSG-RAN WG4 Meeting #93, Reno, USA, Nov. 18-22, 2019, R4-1913338, 4 pages.
Extended European Search Report issued in EP21804991.4, dated Sep. 12, 2023, 10 pages.

* cited by examiner

RESOURCE MULTIPLEXING METHOD AND APPARATUS

CROSS-REFERENCE TO RELATED APPLICATIONS

This application is a continuation of International Application No. PCT/CN2021/092640, filed on May 10, 2021, which claims priority to Chinese Patent Application No. 202010414384.7, filed on May 15, 2020. The disclosures of the aforementioned applications are hereby incorporated by reference in their entireties.

TECHNICAL FIELD

This application relates to the field of communication technologies, and in particular, to a resource multiplexing method and apparatus.

BACKGROUND

With continuous development of mobile communication technologies, spectrum resources become increasingly insufficient. To improve spectrum utilization, base stations will be deployed more densely in the future. In addition, dense deployment may further avoid coverage holes. In a conventional cellular network architecture, a base station establishes a connection to a core network through an optical fiber. However, deployment costs of optical fibers are very high in many scenarios. A relay node (RN) establishes a connection to the core network over a wireless backhaul link, to reduce a part of the deployment costs of the optical fibers.

Currently, an in-band relay solution is provided. In-band relay is a relay solution in which a backhaul link and an access link share a same frequency band. The in-band relay is generally subject to a half-duplex constraint. Specifically, when receiving a downlink signal sent by a parent node of the relay node, the relay node cannot send a downlink signal to a child node of the relay node, and when receiving an uplink signal sent by the child node of the relay node, the relay node cannot send an uplink signal to the parent node of the relay node. An in-band relay solution in a next-generation wireless communication system (new radio, NR) is referred to as integrated access and backhaul (JAB). When an IAB node operates normally, resource multiplexing is performed on an access link and a backhaul link in a time division manner, a space division manner, or a frequency division manner.

A time division multiplexing (TDM) scenario is used as an example. The backhaul link and the access link work at different moments. Therefore, the IAB node needs to switch between receiving and sending on the backhaul link and receiving and sending on the access link. When switching is performed on the backhaul link and the access link with no interval, in other words, when symbols of the access link and the backhaul link are consecutive, the IAB node has highest resource utilization. However, during implementation, due to various factors such as power amplifier on/off time, a transmission distance, and non-ideal synchronization, switching with no interval cannot be implemented on the backhaul link and the access link. In this case, the IAB node needs to determine a set of available/unavailable symbols of the backhaul link and the access link. Specifically, a manner in which a child node reports the set of available/unavailable symbols or a parent node configures the set of available/unavailable symbols may be used.

However, in the foregoing manner in which the child node reports guard symbols or the parent node configures guard symbols, only configuration/reporting of the guard symbols in a normal timing mode is considered. To support space division multiplexing (SDM) or full duplex, a new timing mode may be introduced. An existing mechanism of the configuration and reporting of the guard symbols cannot implement configuration/reporting of the guard symbols in the new timing mode.

SUMMARY

This application provides a resource multiplexing method and apparatus, to resolve a problem that an existing mechanism of configuration and reporting of a guard symbol cannot implement configuration/reporting of the guard symbol in a new timing mode.

According to a first aspect, a resource multiplexing method is provided. The method includes: receiving, by a first node, first configuration information sent by a second node, where the first configuration information includes first guard interval information associated with a first timing mode of a mobile termination (MT), the first guard interval information includes a first symbol quantity and a second symbol quantity, the first symbol quantity indicates a quantity of guard symbols for switching from a distributed unit (DU) resource to an MT resource, the second symbol quantity indicates a quantity of guard symbols for switching from the MT resource to the DU resource, and the first node is a parent node or a donor node of the second node; and receiving, by the first node, second configuration information sent by the second node, where the second configuration information includes second guard interval information associated with a second timing mode of the MT, the second guard interval information includes a third symbol quantity and a fourth symbol quantity, the third symbol quantity indicates a quantity of guard symbols for switching from the DU resource to the MT resource, and the fourth symbol quantity indicates a quantity of guard symbols for switching from the MT resource to the DU resource. In this aspect, guard interval information configured by the second node is associated with different timing modes, so that the first node can obtain accurate guard interval information corresponding to the different timing modes, to improve flexibility of resource multiplexing performed on an access link and a backhaul link.

In a design, the method further includes: when a timing mode of the first node is the first timing mode, determining a time domain position of the MT resource based on a time domain position of the DU resource and the first guard interval information; or when a timing mode of the first node is the second timing mode, determining a time domain position of the MT resource based on a time domain position of the DU resource and the second guard interval information. In this design, the time domain position of the MT resource may be accurately determined based on guard interval information associated with different used timing modes.

In another design, the method further includes: reporting, by the first node to the second node, third guard interval information associated with the first timing mode of the MT, where the third guard interval information includes a fifth symbol quantity and a sixth symbol quantity, the fifth symbol quantity indicates a quantity of guard symbols for switching from the DU resource to the MT resource, and the sixth symbol quantity indicates a quantity of guard symbols for switching from the MT resource to the DU resource; and reporting, by the first node to the second node, fourth guard interval information associated with the second timing mode of the MT, where the fourth guard interval information includes a seventh symbol quantity and an eighth symbol quantity, the seventh symbol quantity indicates a quantity of guard symbols for switching from the DU resource to the MT resource, and the eighth symbol quantity indicates a quantity of guard symbols for switching from the MT resource to the DU resource. In this design, the first node may further report guard interval information associated with different timing modes determined by the first node. The second node may configure the guard interval information with reference to the guard interval information reported by the first node, where for example, the configured guard interval information is completely or partially the same as the guard interval information reported by the first node. Alternatively, the second node may configure the guard interval information without reference to the guard interval information reported by the first node.

In still another design, a value range of the first symbol quantity is [−3,4], a value range of the second symbol quantity is [−3,4], a value range of the third symbol quantity is [−3,4], and a value range of the fourth symbol quantity is [−3,4], where the first symbol quantity, the second symbol quantity, the third symbol quantity, and the fourth symbol quantity are integers.

In still another design, a value range of the fifth symbol quantity is [−3,4], a value range of the sixth symbol quantity is [−3,4], a value range of the seventh symbol quantity is [−3,4], and a value range of the eighth symbol quantity is [−3,4], where the fifth symbol quantity, the sixth symbol quantity, the seventh symbol quantity, and the eighth symbol quantity are integers.

In still another design, the first timing mode is a timing mode 1, and the second timing mode is a timing mode 6; the first timing mode is a timing mode 1, and the second timing mode is a timing mode 7; or the first timing mode is a timing mode 6, and the second timing mode is a timing mode 7. In this design, the timing mode 1, the timing mode 6, and the timing mode 7 are used as examples. However, this application is not limited to the example timing modes, and a solution of this application may be further applicable to more timing modes.

In still another design, the method further includes: reporting, by the first node, a timing difference between the first timing mode and the second timing mode to the second node. In this design, the first node may accurately determine the time domain position of the MT resource based on the guard interval information associated with the different used timing modes and the timing difference. For example, the timing difference may be reported by the first node. The first timing mode may be the timing mode 1, and the second timing mode may be the timing mode 6.

In still another design, the method further includes: receiving, by the first node, a timing difference that is between the first timing mode and the second timing mode and is configured by the second node. In this design, the first node may accurately determine the time domain position of the MT resource based on the guard interval information associated with the different used timing modes and the timing difference. For example, the timing difference may be configured by the second node. The first timing mode may be the timing mode 1, and the second timing mode may be the timing mode 7.

In still another design, the method further includes: when the second node configures the first node to use a third timing mode, reporting, by the first node to the second node, fifth guard interval information associated with the third timing mode. In this design, for example, the first node currently uses the first timing mode or the second timing mode. When the second node configures the first node to use the new third timing mode, the first node may report, to the second node, the guard interval information associated with the third timing mode. In this way, the second node may configure, with reference to or without reference to the reported guard interval information associated with the third timing mode, the guard interval information associated with the third timing mode.

In still another design, the first symbol quantity includes a quantity of symbols by which a DU downlink symbol and an MT downlink symbol are separated, a quantity of symbols by which the DU downlink symbol and an MT uplink symbol are separated, a quantity of symbols by which a DU uplink symbol and the MT uplink symbol are separated, and a quantity of symbols by which the DU uplink symbol and the MT downlink symbol are separated. The second symbol quantity includes a quantity of symbols by which the MT downlink symbol and the DU downlink symbol are separated, a quantity of symbols by which the MT downlink symbol and the DU uplink symbol are separated, a quantity of symbols by which the MT uplink symbol and the DU uplink symbol are separated, and a quantity of symbols by which the MT uplink symbol and the DU downlink symbol are separated.

In still another design, the determining a time domain position of the MT resource based on a time domain position of the DU resource and the first guard interval information specifically includes: determining, by the first node, that a start symbol of the MT resource located after the DU resource is located after an end symbol of the DU resource, and the end symbol of the DU resource and the start symbol of the MT resource are separated by N symbols, where N is the first symbol quantity; and determining, by the first node, that an end symbol of the MT resource located before the DU resource is located before a start symbol of the DU resource, and the end symbol of the MT resource and the start symbol of the DU resource are separated by M symbols, where M is the second symbol quantity.

According to a second aspect, a resource multiplexing method is provided. The method includes: sending, by a second node, first configuration information to a first node, where the first configuration information includes first guard interval information associated with a first timing mode of a mobile termination (MT), the first guard interval information includes a first symbol quantity and a second symbol quantity, the first symbol quantity indicates a quantity of guard symbols for switching from a distributed unit (DU) resource to an MT resource, the second symbol quantity indicates a quantity of guard symbols for switching from the MT resource to the DU resource, and the first node is a parent node or a donor node of the second node; and sending, by the second node, second configuration information to the first node, where the second configuration information includes second guard interval information associated with a second timing mode of the MT, the second guard interval information includes a third symbol quantity and a fourth symbol quantity, the third symbol quantity indicates a quantity of guard symbols for switching from the DU resource to the MT resource, and the fourth symbol quantity indicates a quantity of guard symbols for switching from the MT resource to the DU resource.

In a design, the method further includes: receiving, by the second node, third guard interval information that is associated with the first timing mode of the MT and that is reported by the first node, where the third guard interval information includes a fifth symbol quantity and a sixth symbol quantity, the fifth symbol quantity indicates a quantity of guard symbols for switching from the DU resource to the MT resource, and the sixth symbol quantity indicates a quantity of guard symbols for switching from the MT resource to the DU resource; and receiving, by the second node, fourth guard interval information that is associated with the second timing mode of the MT and that is reported by the first node, where the fourth guard interval information includes a seventh symbol quantity and an eighth symbol quantity, the seventh symbol quantity indicates a quantity of guard symbols for switching from the DU resource to the MT resource, and the eighth symbol quantity indicates a quantity of guard symbols for switching from the MT resource to the DU resource.

In still another design, a value range of the first symbol quantity is [−3,4], a value range of the second symbol quantity is [−3,4], a value range of the third symbol quantity is [−3,4], and a value range of the fourth symbol quantity is [−3,4], where the first symbol quantity, the second symbol quantity, the third symbol quantity, and the fourth symbol quantity are integers.

In still another design, a value range of the fifth symbol quantity is [−3,4], a value range of the sixth symbol quantity is [−3,4], a value range of the seventh symbol quantity is [−3,4], and a value range of the eighth symbol quantity is [−3,4], where the fifth symbol quantity, the sixth symbol quantity, the seventh symbol quantity, and the eighth symbol quantity are integers.

In still another design, the first timing mode is a timing mode 1, and the second timing mode is a timing mode 6; the first timing mode is a timing mode 1, and the second timing mode is a timing mode 7; or the first timing mode is a timing mode 6, and the second timing mode is a timing mode 7.

In still another design, the method further includes: receiving, by the second node, a timing difference that is between the first timing mode and the second timing mode and is reported by the first node.

In still another design, the method further includes: sending, by the second node, a configured timing difference between the first timing mode and the second timing mode to the first node.

In still another design, the method further includes: when the second node configures the first node to use a third timing mode, receiving, by the second node, fifth guard interval information that is associated with the third timing mode and that is reported by the first node.

According to a third aspect, this application provides a resource multiplexing apparatus. The apparatus may be a first node, or may be a chip or a chip set in a first node. The first node may be a communication device. The apparatus may include a processing unit and a transceiver unit. When the apparatus is the first node, the processing unit may be a processor, and the transceiver unit may be a transceiver. The apparatus may further include a storage module, and the storage module may be a memory. The storage module is configured to store instructions, and the processing unit executes the instructions stored in the storage module, to enable the first node to perform a corresponding function in any one of the first aspect or the designs of the first aspect. When the apparatus is the chip or the chip set in the first node, the processing unit may be a processor, and the transceiver unit may be an input/output interface, a pin, a circuit, or the like. The processing unit executes instructions stored in a storage module, to enable the first node to perform a corresponding function in any one of the first aspect or the designs of the first aspect. The storage module may be a storage module (for example, a register or a cache) in the chip or the chip set, or may be a storage module (for example, a read-only memory or a random access memory) located outside the chip or the chip set.

According to a fourth aspect, this application provides a resource multiplexing apparatus. The apparatus may be a second node, or may be a chip or a chip set in a second node. The second node may be a parent node or a donor node of a communication device. The apparatus may include a processing unit and a transceiver unit. When the apparatus is the second node, the processing unit may be a processor, and the transceiver unit may be a transceiver. The apparatus may further include a storage module, and the storage module may be a memory. The storage module is configured to store instructions, and the processing unit executes the instructions stored in the storage module, to enable the second node to perform a corresponding function in any one of the second aspect or the designs of the second aspect. When the apparatus is the chip or the chip set in the second node, the processing unit may be a processor, and the transceiver unit may be an input/output interface, a pin, a circuit, or the like. The processing unit executes instructions stored in a storage module, to enable the second node to perform a corresponding function in any one of the second aspect or the designs of the second aspect. The storage module may be a storage module (for example, a register or a cache) in the chip or the chip set, or may be a storage module (for example, a read-only memory or a random access memory) located outside the chip or the chip set.

According to a fifth aspect, a resource multiplexing apparatus is provided. The apparatus includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the resource multiplexing method according to any one of the first aspect or the designs of the first aspect.

According to a sixth aspect, a resource multiplexing apparatus is provided. The apparatus includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the resource multiplexing method according to any one of the second aspect or the designs of the second aspect.

According to a seventh aspect, a resource multiplexing method is provided. The method includes: determining, by a first node, a type of a start symbol or an end symbol of a distributed unit DU resource, where an end symbol of a mobile termination (MT) resource is located before the start symbol of the DU resource, or a start symbol of an MT resource is located after the end symbol of the DU resource; obtaining, by the first node, a guard symbol quantity group associated with the type of the start symbol or the end symbol of the DU resource, where the guard symbol quantity group includes a first symbol quantity and a second symbol quantity, the first symbol quantity indicates a quantity of guard symbols for switching from the DU resource to the MT resource, and the second symbol quantity indicates a quantity of guard symbols for switching from the MT resource to the DU resource; and determining, by the first node, a time domain position of the MT resource based on a time domain position of the DU resource and the guard symbol quantity group associated with the type of the start symbol or the end symbol of the DU resource. In this aspect, the time domain position of the MT resource is determined based on the time domain position of the DU resource and the guard symbol quantity group associated with the type of the start symbol or the end symbol of the DU resource, so that time domain positions of MT resources corresponding to different types of start symbols or end symbols of DU resources can be accurately determined, to avoid a resource conflict between a backhaul link and an access link.

In a design, the end symbol of the DU resource includes the following types: a symbol on a boundary of a DU hard resource, a symbol on a boundary of a DU soft resource indicated as available, a symbol on a boundary of a resource that is occupied by a special signal or channel and converted into a DU hard resource, a symbol on a boundary of a DU slot, a symbol in a DU slot, a symbol at a start position of a DU downlink slot, a symbol at an end position of a DU downlink slot, a symbol at a start position of a DU uplink slot, and a symbol at an end position of a DU uplink slot.

In another design, the start symbol of the DU resource includes the following types: a symbol on a boundary of a DU hard resource, a symbol on a boundary of a DU soft resource indicated as available, a symbol on a boundary of a resource that is occupied by a special signal or channel and converted into a DU hard resource, a symbol on a boundary of a DU slot, a symbol in a DU slot, a symbol at a start position of a DU downlink slot, a symbol at an end position of a DU downlink slot, a symbol at a start position of a DU uplink slot, and a symbol at an end position of a DU uplink slot.

In still another design, the guard symbol quantity group includes one or more of the following groups: a guard symbol quantity group reported by the first node and a guard symbol quantity group configured by the second node; or a guard symbol quantity group configured by the second node and a preset guard symbol quantity group. In this design, different types of start symbols or end symbols of DU resources use different guard symbol quantity groups, to accurately determine the time domain position of the MT resource, so that the resource conflict between the backhaul link and the access link can be avoided.

According to an eighth aspect, this application provides a resource multiplexing apparatus. The apparatus may be a first node, or may be a chip or a chip set in a first node. The first node may be a communication device, or may be a parent node or a donor node of a communication device. The apparatus may include a processing unit and a transceiver unit. When the apparatus is the first node, the processing unit may be a processor, and the transceiver unit may be a transceiver. The apparatus may further include a storage module, and the storage module may be a memory. The storage module is configured to store instructions, and the processing unit executes the instructions stored in the storage module, to enable the first node to perform a corresponding function in the seventh aspect. When the apparatus is the chip or the chip set in the first node, the processing unit may be a processor, and the transceiver unit may be an input/output interface, a pin, a circuit, or the like. The processing unit executes instructions stored in a storage module, to enable the first node to perform a corresponding function in the seventh aspect. The storage module may be a storage module (for example, a register or a cache) in the chip or the chip set, or may be a storage module (for example, a read-only memory or a random access memory) located outside the chip or the chip set.

According to a ninth aspect, a resource multiplexing apparatus is provided. The apparatus includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the resource multiplexing method according to any one of the seventh aspect or the designs of the seventh aspect.

According to a tenth aspect, this application further provides a computer-readable storage medium. The computer-readable storage medium stores instructions. When the instructions are run on a computer, the computer is enabled to perform the resource multiplexing method according to any one of the first aspect, the second aspect, and the seventh aspect, or the designs of the first aspect, the second aspect, and the seventh aspect.

According to an eleventh aspect, this application further provides a computer program product including instructions. When the computer program product runs on a computer, the computer is enabled to perform the resource multiplexing method according to any one of the first aspect, the second aspect, and the seventh aspect, or the designs of the first aspect, the second aspect, and the seventh aspect.

According to a twelfth aspect, an embodiment of this application provides a chip. The chip is coupled to a memory, to perform the resource multiplexing method according to any one of the first aspect, the second aspect, and the seventh aspect, or the designs of the first aspect, the second aspect, and the seventh aspect of embodiments of this application.

It should be noted that "coupling" in embodiments of this application indicates a direct combination or an indirect combination of two components.

DESCRIPTION OF EMBODIMENTS

Usually, a relay node establishes a wireless backhaul link to one or more parent nodes, and accesses a core network through the parent node. The parent node may control (for example, perform data scheduling, timing modulation, and power control on) the relay node by using a plurality of types of signaling. In addition, the relay node may provide a service for a plurality of child nodes. The parent node of the relay node may be a base station, or may be another relay node. The child node of the relay node may be user equipment (UE), or may be another relay node. In some cases, the parent node may also be referred to as an upstream node, and the child node may also be referred to as a downstream node.

In-band relay is a relay solution in which a backhaul link and an access link share a same frequency band. Because no additional spectrum resource is used, the in-band relay has advantages such as high spectral efficiency and low deployment costs. The in-band relay is generally subject to a half-duplex constraint. Specifically, when receiving a downlink signal sent by the parent node of the relay node, the relay node cannot send a downlink signal to the child node of the relay node, and when receiving an uplink signal sent by the child node of the relay node, the relay node cannot send an uplink signal to the parent node of the relay node. An in-band relay solution in a next-generation wireless communication system (new radio, NR) is referred to as integrated access and backhaul (JAB), and a relay node is referred to as an IAB node.

Figure 1:
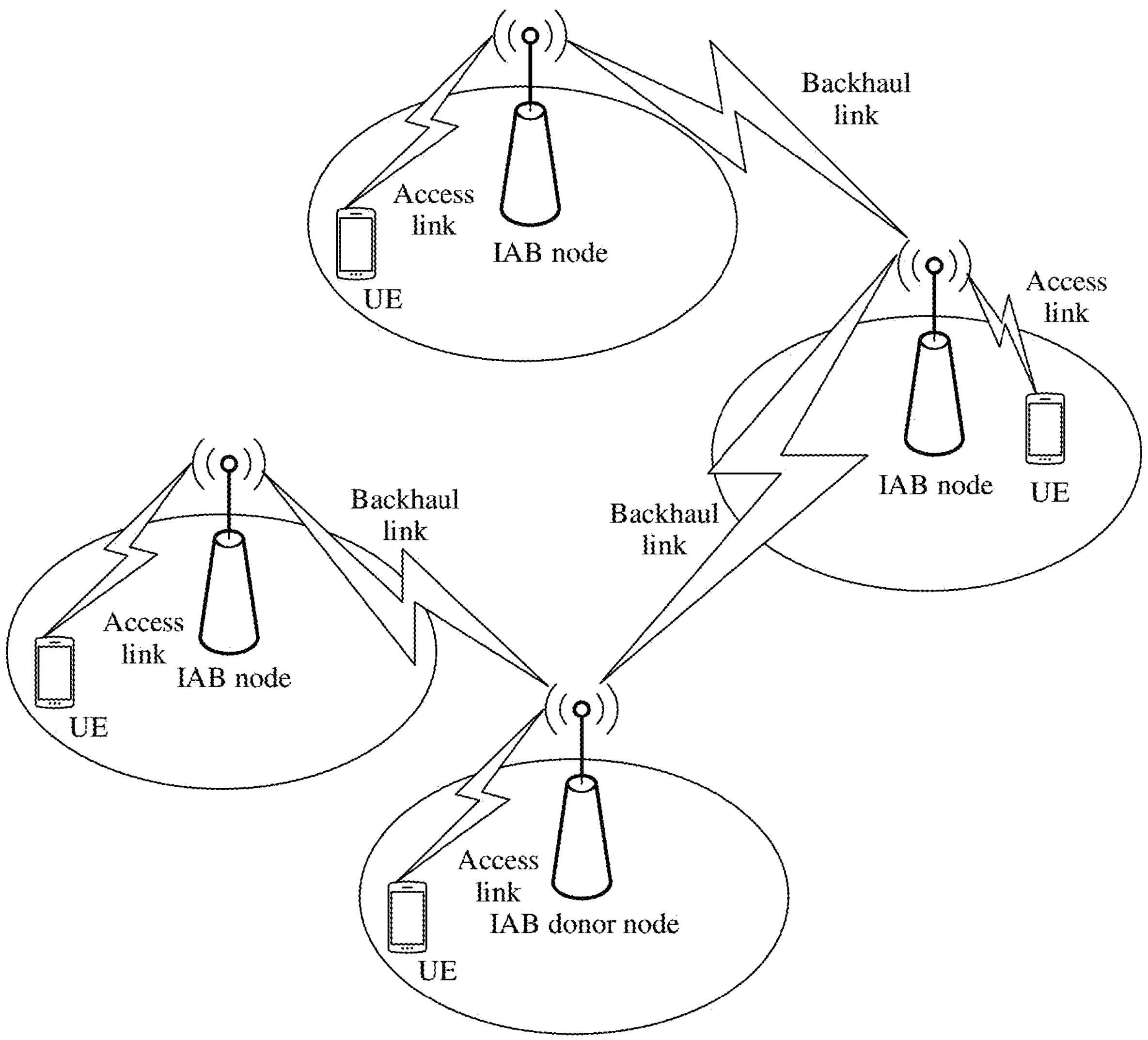
FIG. 1 is a schematic diagram of a structure of an IAB system according to an embodiment of this application.

As shown in FIG. 1, an IAB node provides wireless access and wireless backhaul of an access service for UE. An IAB donor node provides a wireless backhaul function for the IAB node, and provides an interface between the UE and a core network. The IAB node is connected to the IAB donor node over a wireless backhaul link, so that the UE served by the IAB node is connected to the core network.

When the IAB node operates normally, resource multiplexing is performed on an access link and a backhaul link in a time division manner, a space division manner, or a frequency division manner. A TDM scenario is used as an example. The backhaul link and the access link work at different moments. Therefore, the IAB node needs to switch between receiving and sending on the backhaul link and receiving and sending on the access link. When switching is performed on the backhaul link and the access link with no interval, in other words, when symbols of the access link and the backhaul link are consecutive, the IAB node has highest resource utilization. However, during implementation, due to various factors such as power amplifier on/off time, a transmission distance, and non-ideal synchronization, switching with no interval cannot be implemented on the backhaul link and the access link. In this case, the IAB node needs to determine a set of available/unavailable symbols of the backhaul link and the access link.

In NR, the IAB node may be divided into two parts: a mobile termination (MT) and a distributed unit (DU). The MT is used by the IAB node to communicate with a parent node, and the DU is used by the IAB node to communicate with a child node. The parent node may be a common base station (for example, a gNB), or may be another IAB node. The child node may be UE, or may be another IAB node.

Figure 2:
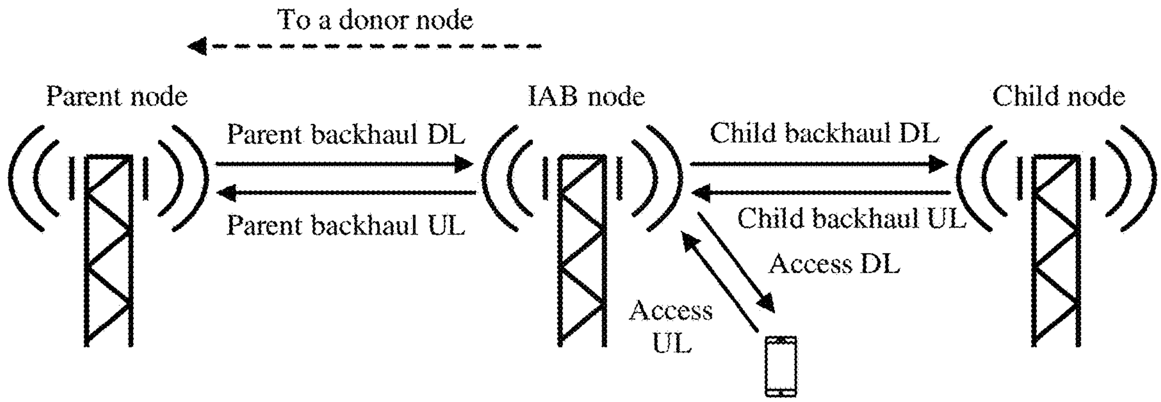
FIG. 2 is a schematic diagram of a backhaul link and an access link according to an embodiment of this application.

A link for communication between the MT and the parent node is referred to as a parent backhaul link (parent BH link), a link for communication between the DU and the IAB child node is referred to as a child backhaul link (child BH link), and a link for communication between the DU and UE served by the DU is referred to as an access link. The parent backhaul link includes a parent backhaul uplink (uplink, UL) and a parent backhaul downlink (downlink, DL); the child backhaul link includes a child backhaul UL and a child backhaul DL; and the access link includes an access UL and an access DL, as shown in FIG. 2. In some cases, the child backhaul link is also referred to as an access link.

First, existing conclusions of NR IAB resource allocation are described:

MT resource: MT resources of an IAB node may be configured, based on transmission directions, as three types: downlink (D), uplink (U), and flexible (F). The three transmission-direction-based types are also supported by existing UE, and therefore may be indicated by using existing signaling.

DU resource: DU resources of an IAB node may be classified, based on transmission directions, into three types: uplink, downlink, and flexible. Further, DU uplink, downlink, and flexible resources may be classified, based on resource multiplexing manners, into three types: hard (H), soft (S), and not available (NA).

Specifically:

DU hard resource: The DU hard resource indicates a resource that is always available to the DU.

DU soft resource: Whether the DU soft resource is available to the DU depends on an indication of a parent node.

DU unavailable resource: The DU unavailable resource is a resource that is always unavailable to the DU.

Figure 3:
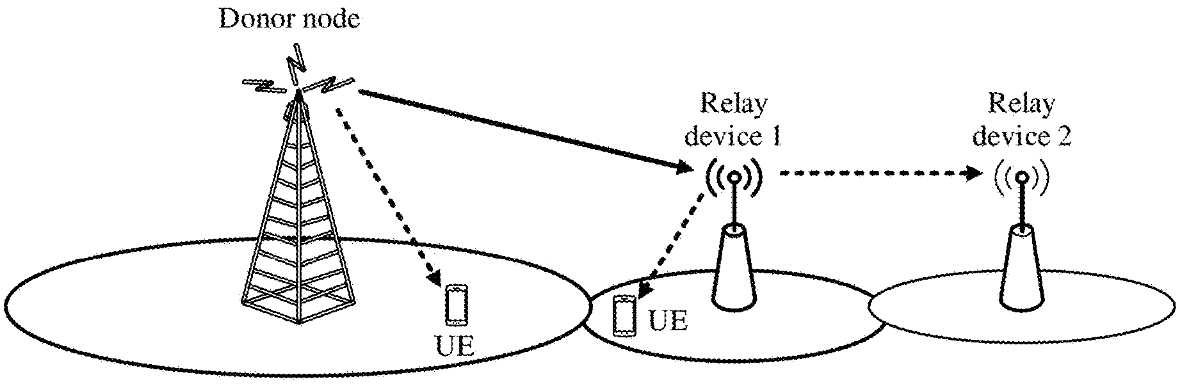
FIG. 3 is a schematic diagram of an architecture of a wireless communication system that has a relay node and to which this application is applicable.

A resource multiplexing method provided in embodiments of this application may be applied to a wireless communication system having a relay node, as shown in FIG. 3. It should be understood that FIG. 3 is merely an example for description, and quantities of user equipments and relay devices that are included in the wireless communication system are not specifically limited. In NR, the relay device is generally referred to as an IAB node. In LTE, the relay device is generally referred to as an RN.

The communication system shown in FIG. 3 may include various communication systems, for example, may be an internet of things (IoT) communication system, a narrowband internet of things (NB-IoT) communication system, or a long term evolution (LTE) communication system, may be a $5^{th}$ generation (5G) communication system or a next-generation communication system, for example, 6G, may be a hybrid architecture of LTE and 5G, or may be a 5G NR system, a global system for mobile communication (GSM), a universal mobile telecommunications system (UMTS), a code division multiple access (CDMA) system, and a new communication system that will emerge in future communication development.

The parent node in embodiments of this application is a common base station, and the common base station may also be referred to as a radio access network (RAN) node (or device). For example, the common base station may be a next-generation NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a transmission point TP.

Figure 4:
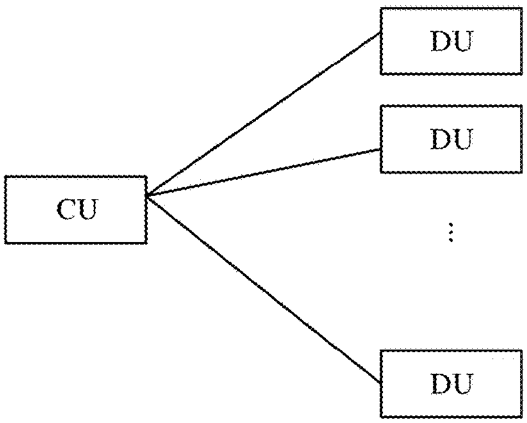
FIG. 4 is a schematic diagram of a structure of a base station according to an embodiment of this application.

For example, a structure of the common base station in embodiments of this application may be shown in FIG. 4. Specifically, the base station may be divided into a central unit (CU) and at least one distributed unit (DU). The CU may be configured to manage or control the at least one DU, which may also be referred to as that the CU is connected to the at least one DU. In this structure, protocol layers of a radio access network device in the communication system may be split. Some protocol layers are controlled by the CU in a centralized manner, functions of some or all of remaining protocol layers are distributed in the DU, and the CU controls the DU in a centralized manner. For example, the base station is a gNB. Protocol layers of the gNB include a radio resource control (RRC) layer, a service data adaptation protocol (SDAP) layer, a packet data convergence protocol (PDCP) layer, a radio link control (RLC) layer, a media access control (MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this application.

Figure 5:
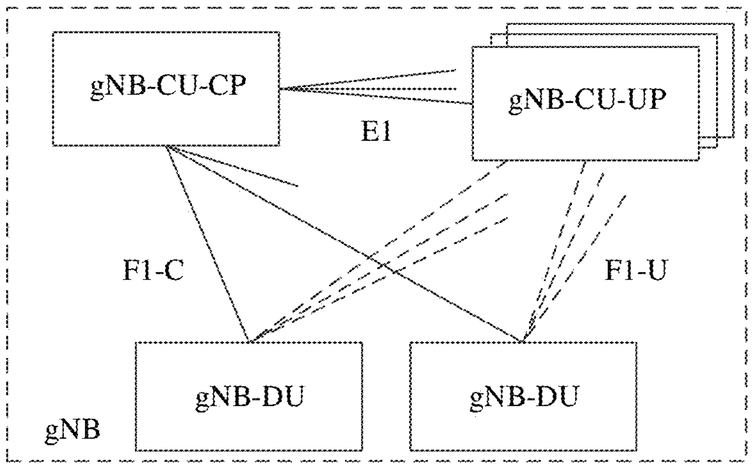
FIG. 5 is a schematic diagram of a structure of another base station according to an embodiment of this application.

For example, the CU in embodiments of this application may be further divided into one control plane (CU-control plane, CU-CP) network element and a plurality of user plane (CU-user plane, CU-UP) network elements. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, a gNB is used as an example. A structure of the gNB may be shown in FIG. 5.

Figure 6:
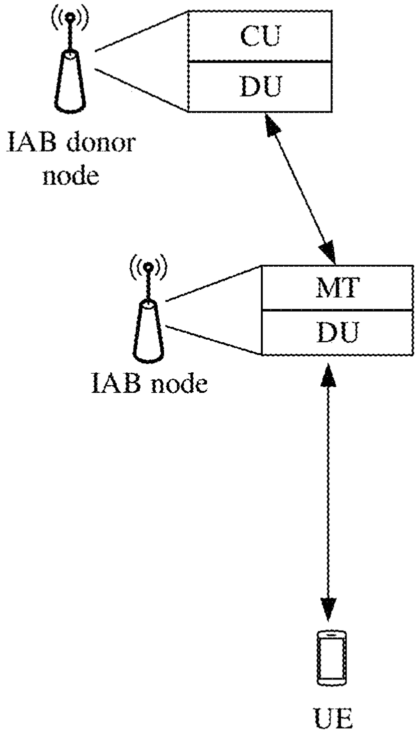
FIG. 6 is a schematic diagram of communication of an IAB node according to an embodiment of this application.
Figure 7:
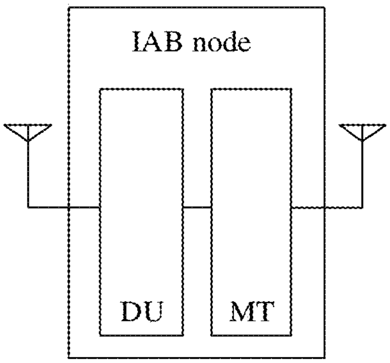
FIG. 7 is a schematic diagram of a structure of an IAB node according to an embodiment of this application.

The IAB node in embodiments of this application may include an MT function and a DU function. To be specific, the IAB node communicates with a parent node through the MT, and the DU is a base station function module of the IAB node, is configured to implement functions of an RLC layer, a MAC layer, and a physical layer, and is mainly responsible for scheduling and physical signal generation and sending. That is, the IAB node communicates with a child node and UE through the DU, as shown in FIG. 6. Both the MT and the DU of the IAB node have complete transceiver modules, and there is an interface between the MT and the DU. However, it should be noted that the MT and the DU are logical modules. In practice, the MT and the DU may share some sub-modules, for example, may share a transceiver antenna and a baseband processing module, as shown in FIG. 7.

The user equipment in embodiments of this application is a user-side entity configured to receive or transmit a signal. The user equipment may be a device that provides voice and/or data connectivity for a user, for example, a handheld device or a vehicle-mounted device having a wireless connection function. The user equipment may alternatively be another processing device connected to a wireless modem. The user equipment may communicate with one or more core networks through a radio access network (RAN). The user equipment may also be referred to as a wireless terminal, a subscriber unit, a subscriber station, a mobile station, a remote station, an access point, a remote terminal, an access terminal, a user terminal, a user agent, a user device, user equipment, or the like. The user equipment may be a mobile termination such as a mobile phone (or referred to as a "cellular" phone), and a computer that has a mobile termination, for example, may be a portable, pocket-sized, handheld, computer built-in or in-vehicle mobile apparatus. The mobile termination and the computer exchange languages and/or data with the radio access network. For example, the user equipment may alternatively be a device such as a personal communication service (PCS) phone, a cordless telephone set, a session initiation protocol (SIP) phone, a wireless local loop (WLL) station, or a personal digital assistant (PDA). For example, common user equipments include a mobile phone, a tablet computer, a notebook computer, a palmtop computer, a mobile internet device (MID), and a wearable device such as a smartwatch, a smart band, or a pedometer. However, embodiments of this application are not limited thereto.

It should be understood that, in embodiments of this application, "at least one" means one or more, and "a plurality of" means two or more. The term "and/or" describes an association relationship between associated objects, and indicates that any one of three relationships may exist. For example, A and/or B may indicate the following cases: Only A exists, both A and B exist, or only B exists, where A and B may be singular or plural. The character "/" generally indicates an "or" relationship between the associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The IAB node is a specific name of a relay node, and does not constitute a limitation on the solutions in this application. The IAB node may be the foregoing base station or terminal device having a forwarding function, or may be in an independent device form. For example, the IAB node in this application may also be referred to as a relay node (RN), a TRP, a relay transmission reception point (relay TRP), or the like.

In addition, it should be understood that in description of this application, terms such as "first" and "second" are merely used for distinguishing and description, but should not be understood as indicating or implying relative importance, or should not be understood as indicating or implying a sequence.

The following describes resource multiplexing methods in this application with reference to FIG. 1 to FIG. 19.

For IAB in a time division duplex (TDD) mode, there are the following eight switching scenarios shown in table 1: four MT-to-DU switching scenarios and four DU-to-MT switching scenarios.

TABLE 1

Switching scenarios and corresponding guard symbols

| Switching scenario | | Field indicating a quantity of guard symbols in a MAC CE |
|---|---|---|
| IAB-MT operation to IAB-DU operation | DL Rx to DL Tx | $NmbGS_1$ |
| | DL Rx to UL Rx | $NmbGS_2$ |
| | UL Tx to DL Tx | $NmbGS_3$ |
| | UL Tx to UL Rx | $NmbGS_4$ |
| IAB-DU operation to IAB-MT operation | DL Tx to DL Rx | $NmbGS_5$ |
| | UL Rx to DL Rx | $NmbGS_6$ |
| | DL Tx to UL Tx | $NmbGS_7$ |
| | UL Rx to UL Tx | $NmbGS_8$ |

DL Rx represents MT downlink receiving, DL Tx represents DU downlink sending, UL Tx represents MT uplink sending, and UL Rx represents DU uplink receiving.

In the foregoing eight switching scenarios, an MT frame and a DU frame have different offsets, and switching between an MT and a DU may correspond to different hardware switching periods. Therefore, the eight scenarios may correspond to different quantities of guard symbols.

To prevent a resource conflict between a backhaul link and an access link, an JAB node and a parent node of the JAB node need to have a consistent understanding of quantities of guard symbols in various switching scenarios. Therefore, the JAB node can calculate a quantity of guard symbols based on a timing difference between the MT and the DU and a switching interval, and report the quantity of guard symbols to the parent node. The parent node may configure the quantity of guard symbols for the JAB node with reference to a value reported by the JAB node and a scheduling policy.

Figure 8:
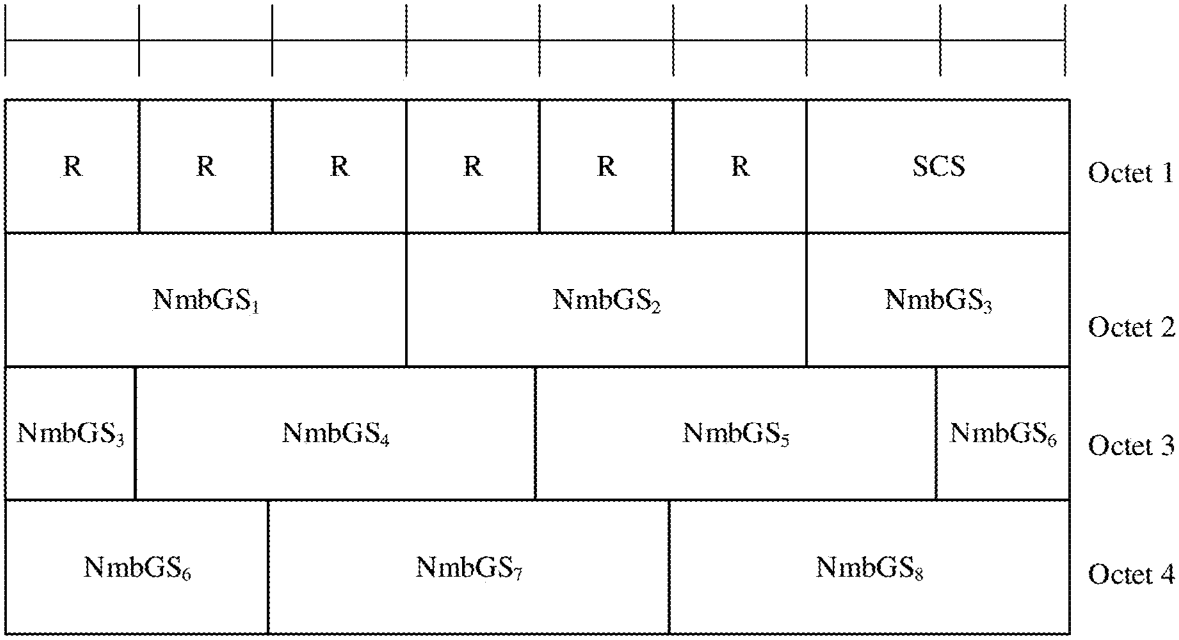
FIG. 8 is a schematic diagram of formats of fields for quantities of guard symbols carried in a media access control control element (MAC CE) according to an embodiment of this application.

FIG. 8 is a schematic diagram of formats of fields in a MAC CE that carries quantities of guard symbols. A child node may report, to a parent node via the MAC CE, quantities of guard symbols corresponding to different switching scenarios, and the parent node may also configure, for the child node via the MAC CE, the quantities of guard symbols corresponding to the different switching scenarios. Certainly, alternatively, quantities of guard symbols may be reported and configured via another message.

The TDD mode corresponds to a normal timing mode (or referred to as a basic timing mode or a timing mode 1). The timing mode 1 is used for uplink transmission timing that is based on a timing advance (TA). The timing mode may be used for uplink transmission timing of UE and an IAB-MT. In the timing mode, uplink transmit frame timing is earlier than downlink receive frame timing, and an advance is the TA. The IAB-MT may obtain a specific value of the TA through configuration and signaling update performed by the parent node. In a protocol, an advance TA is denoted as $T_{TA}$, and $T_{TA}=(N_{TA}+N_{TA,offset})T_c$, where $T_c$ is a time unit defined in an NR standard, $N_{TA}$ is obtained through configuration and update performed by a parent node, and $N_{TA,offset}$ is a band-related offset defined in the protocol or configured by the parent node.

Therefore, the foregoing configuration and reporting are merely configuration and reporting of a quantity of guard symbols in the timing mode 1. However, there are the following other types of resource multiplexing between the backhaul link and the access link: 1. Simultaneous sending of the MT and the DU, which is alternatively referred to as transmit space division multiplexing (No TDM for MT-TX/DU-TX); 2. Simultaneous receiving of the MT and the DU, which is alternatively referred to as receive space division multiplexing (No TDM for MT-RX/DU-RX); 3. Uplink full duplex, to be specific, the IAB node simultaneously performs uplink sending and uplink receiving (No TDM for MT-TX/DU-RX); and 4. Downlink full duplex, to be specific, the IAB node simultaneously performs downlink sending and downlink receiving (No TDM for MT-RX/DU-TX).

To support space division multiplexing and full duplex, a new timing mode may be introduced. A mechanism of the configuration and reporting of the quantity of guard symbols cannot implement configuration and reporting of the quantity of guard symbols in the new timing mode.

The following describes a solution for configuring and reporting a quantity of guard symbols in the case of a plurality of timing modes after the new timing mode is introduced.

Figure 9:
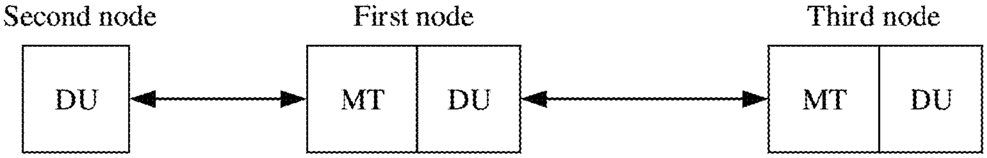
FIG. 9 is a schematic diagram of an architecture of another wireless communication system having a relay node according to an embodiment of this application.

FIG. 9 is a schematic diagram of an architecture of another wireless communication system having a relay node according to an embodiment of this application. A first node is a child node of a second node, the first node is a communication device (for example, a base station or a relay node), the second node is a parent node or a donor node of the communication device, a third node is a child node of the first node, and the third node is a communication device (for example, a base station or a relay node). The first node and the third node each include two parts: an MT and a DU. The MT of the first node is configured to communicate with the second node, the DU of the first node is configured to communicate with the third node, the MT of the third node is configured to communicate with the first node, and the DU of the third node is configured to communicate with a child node of the third node.

The following describes a resource multiplexing solution provided in an embodiment of this application with reference to the communication architecture shown in FIG. 9.

First, a concept of the quantity of guard symbols in the following embodiments is described.

A guard symbol is a symbol that is unavailable to MT resources in a specific direction (D/U/F) before and after a DU resource in the specific direction (D/U/F) when transmission is performed on the DU resource.

The different switching scenarios shown in table 1 correspond to different quantities of guard symbols. There may be one or more guard symbols. Specifically, the quantities of guard symbols are classified into:

(1) a quantity of guard symbols for switching from the DU resource to the MT resource, specifically including: a quantity of symbols by which a DU downlink symbol and an MT downlink symbol are separated, a quantity of symbols by which the DU downlink symbol and an MT uplink symbol are separated, a quantity of symbols by which a DU uplink symbol and the MT uplink symbol are separated, and a quantity of symbols by which the DU uplink symbol and the MT downlink symbol are separated; and (2) a quantity of guard symbols for switching from the MT resource to the DU resource, specifically including: a quantity of symbols by which the MT downlink symbol and the DU downlink symbol are separated, a quantity of symbols by which the MT downlink symbol and the DU uplink symbol are separated, a quantity of symbols by which the MT uplink symbol and the DU uplink symbol are separated, and a quantity of symbols by which the MT uplink symbol and the DU downlink symbol are separated.

In the current protocol (R16), a value range of the quantity of guard symbols for switching from the DU resource to the MT resource or the quantity of guard symbols for switching from the MT resource to the DU resource is [0, 4], and values are all integers.

In subsequent evolution, a larger quantity of guard symbols or a negative quantity of guard symbols may be further introduced. Meanings of values of different quantities of guard symbols are described by using switching from the DU to the MT as an example. It is assumed that the last symbol used by the DU is a symbol n. When the quantity of guard symbols is a positive number, for example, 1, the 1$^{st}$ available symbol of the MT is a symbol n+2. When the quantity of guard symbols is 0, the 1$^{st}$ available symbol of the MT is a symbol n+1. When the quantity of guard symbols is a negative number, for example, −1, the 1$^{st}$ available symbol of the MT is the symbol n. It can be learned that when the quantity of guard symbols is a negative number, the MT and the DU may use symbols with a same index.

It can be learned from FIG. 8 and the foregoing discussions that, in the MAC CE, the quantity of guard symbols is represented by using 3 bits. Therefore, available values are 0 to 7. However, in the current protocol, only 0 to 4 are valid.

TABLE 2

| Bit values and quantities of guard symbols in a MAC CE | |
|---|---|
| Bit value | Quantity of guard symbols |
| 0 | 0 |
| 1 | 1 |
| 2 | 2 |
| 3 | 3 |
| 4 | 4 |
| 5 | Reserved |
| 6 | Reserved |
| 7 | Reserved |

If the negative quantity of guard symbols is introduced, a reserved bit may be mapped to a negative number, for example:

TABLE 3

| Bit values and quantities of guard symbols in a MAC CE | |
|---|---|
| Bit value | Quantity of guard symbols |
| 0 | 0 |
| 1 | 1 |
| 2 | 2 |
| 3 | 3 |
| 4 | 4 |
| 5 | −1 |
| 6 | −2 |
| 7 | −3 |

or

TABLE 4

| Bit values and quantities of guard symbols in a MAC CE | |
|---|---|
| Bit value | Quantity of guard symbols |
| 0 | 0 |
| 1 | 1 |
| 2 | 2 |
| 3 | 3 |
| 4 | 4 |
| 5 | −3 |
| 6 | −2 |
| 7 | −1 |

or

TABLE 5

| Bit values and quantities of guard symbols in a MAC CE | |
|---|---|
| Bit value | Quantity of guard symbols |
| 0 | 0 |
| 1 | 1 |
| 2 | 2 |
| 3 | 3 |
| 4 | 4 |
| 5 | 5 |
| 6 | −1 |
| 7 | −2 |

or

TABLE 6

| Bit values and quantities of guard symbols in a MAC CE | |
|---|---|
| Bit value | Quantity of guard symbols |
| 0 | 0 |
| 1 | 1 |
| 2 | 2 |
| 3 | 3 |
| 4 | 4 |
| 5 | 5 |
| 6 | −2 |
| 7 | −1 |

Certainly, in the protocol, not all reserved values may be used, for example:

TABLE 7

| Bit values and quantities of guard symbols in a MAC CE | |
|---|---|
| Bit value | Quantity of guard symbols |
| 0 | 0 |
| 1 | 1 |
| 2 | 2 |
| 3 | 3 |

TABLE 7-continued

| Bit values and quantities of guard symbols in a MAC CE | |
|---|---|
| Bit value | Quantity of guard symbols |
| 4 | 4 |
| 5 | Reserved |
| 6 | −2 or −1 |
| 7 | −1 or −2 |

or

TABLE 8

| Bit values and quantities of guard symbols in a MAC CE | |
|---|---|
| Bit value | Quantity of guard symbols |
| 0 | 0 |
| 1 | 1 |
| 2 | 2 |
| 3 | 3 |
| 4 | 4 |
| 5 | −1 or −2 |
| 6 | −2 or −1 |
| 7 | Reserved |

Figure 10:
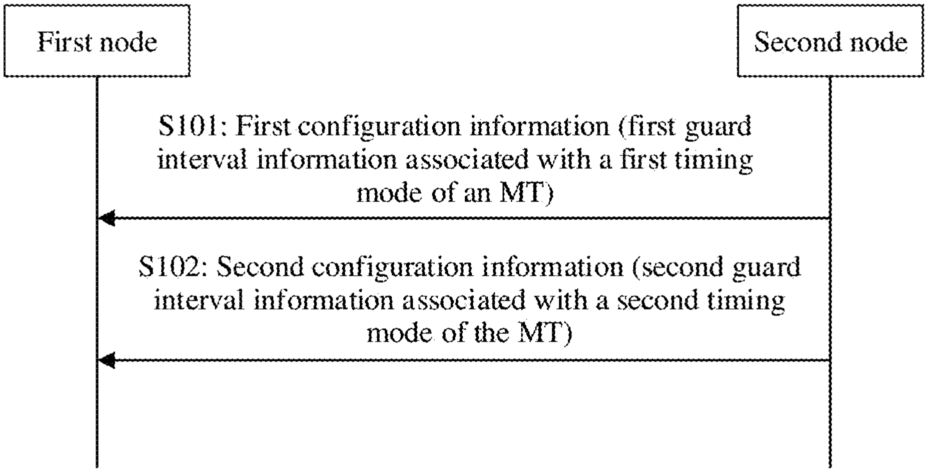
FIG. 10 is a schematic flowchart of a resource multiplexing method according to an embodiment of this application.

FIG. 10 is a schematic flowchart of a resource multiplexing method according to an embodiment of this application. For example, the method may include the following steps.

S101: A second node sends first configuration information to a first node, where the first configuration information includes first guard interval information associated with a first timing mode of an MT. The second node is a parent node or a donor node of the first node.

Accordingly, the first node receives the first configuration information.

In this embodiment, in a process in which the first node communicates with the second node, resource multiplexing may be performed on an access link and a backhaul link of the first node. As described above, resource multiplexing manners include TDM, SDM, full duplex, and the like. To support the foregoing resource multiplexing manners, the first node and the second node may use corresponding timing modes. In this embodiment, a plurality of timing modes are used. Herein, the first timing mode and a second timing mode are used as examples for description. In actual use, more timing modes may be further included.

There is a timing difference between different timing modes. Therefore, different timing modes may correspond to different quantities of guard symbols, in other words, different timing modes are associated with different guard interval information.

The second node configures guard interval information associated with different timing modes, to enable the first node and the second node to uniformly obtain the guard interval information associated with the different timing modes, so as to accurately obtain a time domain position of an MT resource and avoid a resource conflict between the backhaul link and the access link. The configuration may be performed based on all, some, or none of guard interval information that is associated with different timing modes and that is reported by the first node. In other words, a quantity of guard symbols that is configured by the second node may be different from an expected quantity of guard symbols that is reported by the first node.

Specifically, in this step, the second node sends the first configuration information to the first node, where the first configuration information includes the first guard interval information associated with the first timing mode of the MT. The first guard interval information includes a first symbol quantity and a second symbol quantity, where the first symbol quantity indicates a quantity of guard symbols for switching from a DU resource to the MT resource, and the second symbol quantity indicates a quantity of guard symbols for switching from the MT resource to the DU resource.

S102: The second node sends second configuration information to the first node, where the second configuration information includes second guard interval information associated with the second timing mode of the MT.

Accordingly, the first node receives the second configuration information.

The second node further sends the second configuration information, where the second configuration information may be configuration information different from the first configuration information. The first configuration information and the second configuration information may be MAC Ces or the like. The second configuration information includes the second guard interval information associated with the second timing mode of the MT. The second timing mode is different from the first timing mode.

Certainly, the second node may further configure guard interval information associated with more timing modes.

The second guard interval information includes a third symbol quantity and a fourth symbol quantity, where the third symbol quantity indicates a quantity of guard symbols for switching from the DU resource to the MT resource, and the fourth symbol quantity indicates a quantity of guard symbols for switching from the MT resource to the DU resource.

Value ranges of the first symbol quantity to the fourth symbol quantity may be consistent with those in an existing protocol, in other words, the value ranges are [0, 4], and the first symbol quantity to the fourth symbol quantity are all integers. The value ranges of the first symbol quantity to the fourth symbol quantity may alternatively be other ranges. For example, a negative quantity of guard symbols or a larger quantity of guard symbols may be introduced.

The guard interval information associated with the different timing modes is configured. In this way, when the second node configures the first node to use the different timing modes, the first node and the second node may determine a time domain resource position of the MT based on the obtained guard interval information associated with the different timing modes, a time domain resource position of a DU, to avoid the resource conflict between the access link and the backhaul link, and improve flexibility of the resource multiplexing performed on the access link and the backhaul link.

Optionally, the second node may configure, in an explicit manner, a timing mode used by the first node, or may configure, in an implicit manner, a timing mode used by the first node.

For example, the second node sends indication information, where the indication information carries information indicating the timing mode used by the first node. Optionally, the indication information may be carried in downlink control information (DCI).

For another example, the first node determines, based on a resource index or a resource type, the timing mode used by the first node. For example, when a type of the DU resource corresponding to the MT resource is a hard resource, a mode 6 is used; when a type of the DU resource corresponding to the MT resource is a soft resource, the timing mode is a mode 1. Alternatively, the parent node or the donor node preconfigures a correspondence between a resource index and a timing mode. For example, when the resource index is X, a timing mode 1 is used; when the resource index is Y, a timing mode 6 is used; when the resource index is Z, a timing mode 7 is used.

It should be understood that the "MT resource" is only an example name of a transmission resource for communication between an IAB node and a parent node of the IAB node. In actual application, the transmission resource for communication between the IAB node and the parent node of the IAB node may alternatively have another name, for example, an X resource. If the X resource can be used for communication between the IAB node and the parent node of the IAB node, the X resource may be considered as an MT resource in this embodiment. Similarly, the "DU resource" is only an example name of a transmission resource for communication between the IAB node and a child node of the IAB node. In actual application, the transmission resource for communication between the IAB node and the child node of the IAB node may alternatively have another name, for example, an A resource. If the A resource can be used for communication between the IAB node and the child node of the IAB node, the A resource may be considered as a DU resource in this embodiment.

According to the resource multiplexing method provided in this embodiment, the guard interval information configured by the second node is associated with the different timing modes, so that the first node can obtain the guard interval information corresponding to the different timing modes, to improve the flexibility of the resource multiplexing performed on the access link and the backhaul link.

Figure 11:
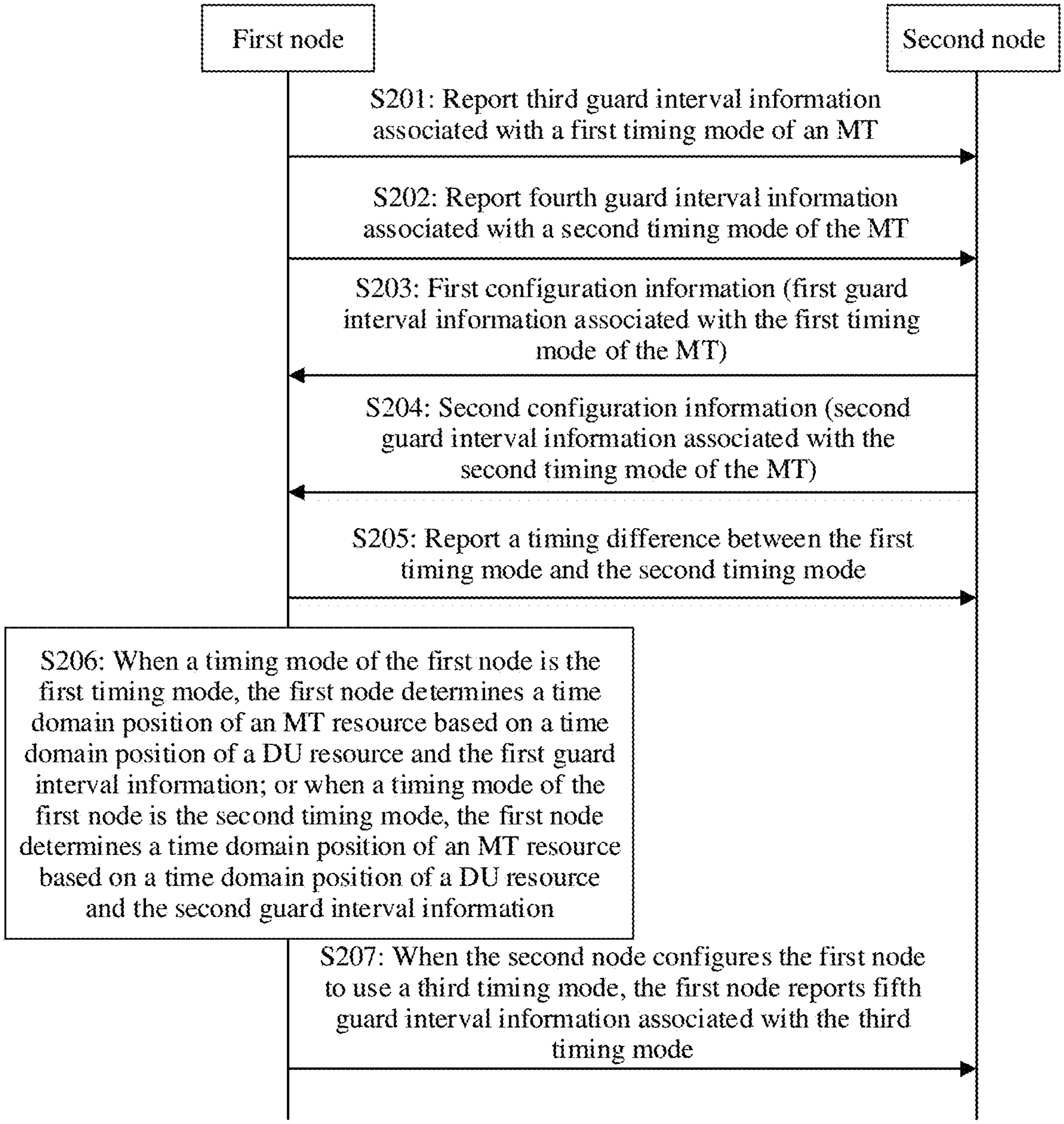
FIG. 11 is a schematic flowchart of another resource multiplexing method according to an embodiment of this application.

FIG. 11 is a schematic flowchart of a resource multiplexing method according to an embodiment of this application. For example, the method may include the following steps.

S201: A first node reports, to a second node, third guard interval information associated with a first timing mode of an MT.

Accordingly, the second node receives the third guard interval information associated with the first timing mode of the MT.

Figure 12:
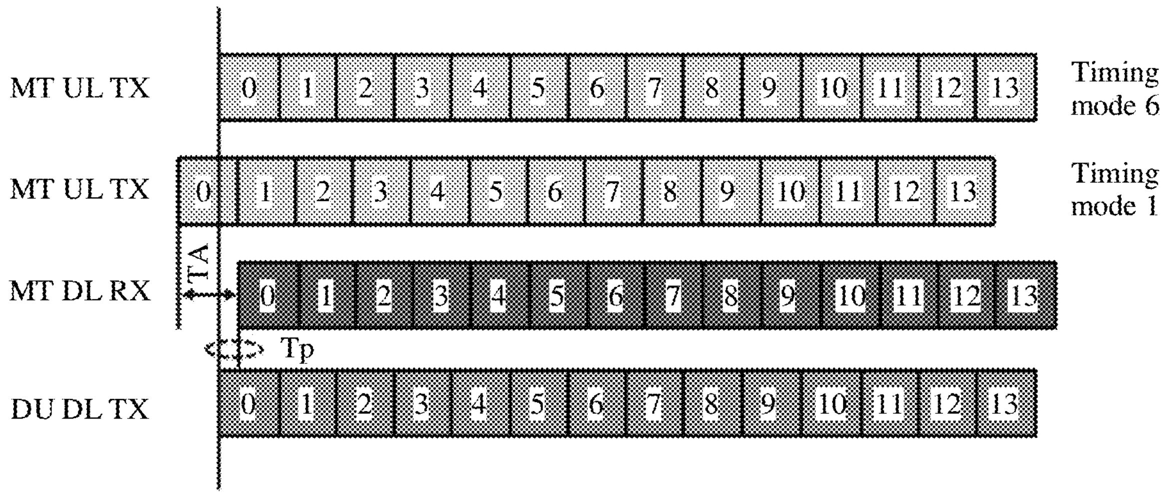
FIG. 12 is a schematic diagram of principles of a timing mode 1 and a timing mode 6.

In this embodiment, the first timing mode is a timing mode 1. The timing mode 1 is used for uplink transmission timing that is based on a TA. The timing mode may be used for uplink transmission timing of UE and an IAB-MT. FIG. 12 is a schematic diagram of principles of a timing mode 1 and a timing mode 6. In the timing mode 1, uplink transmit frame timing of an MT (MT UL Tx) is earlier than downlink receive frame timing of the MT (MT DL Rx) (as shown in schematic diagrams of slots in the second row and the third row in FIG. 12), and an advance is TA.

To support space division multiplexing of an IAB node, specifically, to support simultaneous sending of the MT and a DU of the IAB node (the first resource multiplexing manner described above), a second timing mode, namely, the timing mode 6, is introduced. As shown in FIG. 12, when the timing mode 6 is used for uplink sending of the MT (MT UL Tx) of the IAB node, the uplink sending of the MT of the IAB node and downlink sending of the DU (DU DL Tx) that is co-located with the MT of the IAB node are aligned in time domain (as shown in schematic diagrams of slots in the first row and the fourth row in FIG. 12). An aligned time unit may be a slot or a symbol. A specific time unit is not limited in this application. In the example of FIG. 12, aligned units of timing of the MT and the DU are slots.

Figure 13:
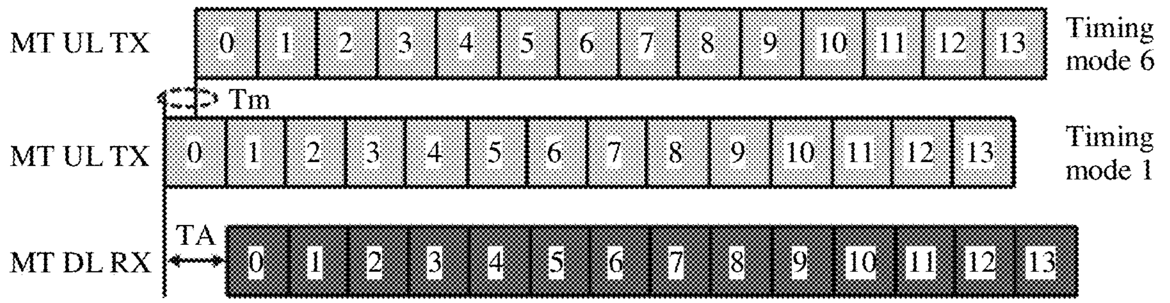
FIG. 13 is a schematic diagram of a timing difference between a timing mode 1 and a timing mode 6.

As shown in FIG. 12, when the timing mode 1 is used, uplink sending of the MT of the IAB node is earlier than downlink receiving of the MT, and an advance is TA. When the timing mode 6 is used, the uplink sending of the MT of the IAB node is aligned with the downlink sending of the DU of the IAB node. In an ideal case, TA=2Tp+Tg, where Tp is a delay of propagation from the IAB node to a parent node, and Tg is a timing difference between an uplink frame and a downlink frame of a DU of the parent node. In addition, the downlink sending timing of the DU of the IAB node is earlier than the downlink receiving of the MT, and an advance is Tp. In conclusion, as shown in FIG. 13, there is a timing difference between the timing mode 1 and the timing mode 6 of the IAB node, and the difference is Tm=Tp+Tg.

When the IAB node uses the timing mode 1 or the timing mode 6, there is the timing difference between the timing modes. Therefore, when the IAB node uses different uplink timing (mainly for the switching scenarios shown in table 1: MT UL Tx to DU DL Tx, MT UL Tx to DU UL Rx, DU DL Tx to MT UL Tx, and DU UL Rx to MT UL Tx), there may be different quantities of guard symbols, that is, different timing modes are associated with different guard interval information. However, the parent node does not know a symbol configuration of a DU of a child node. To enable the first node and the second node to uniformly obtain guard interval information of the MT during resource multiplexing, the first node reports, to the second node, guard interval information associated with different timing modes of the MT.

Specifically, before this step, the first node determines that a start symbol of an MT resource located after a DU resource is located after an end symbol of the DU resource, and the end symbol of the DU resource and the start symbol of the MT resource are separated by N1 symbols, where N1 is a fifth symbol quantity. The first node determines that an end symbol of the MT resource located before the DU resource is located before a start symbol of the DU resource, and the end symbol of the MT resource and the start symbol of the DU resource are separated by M1 symbols, where M1 is a sixth symbol quantity.

In this step, the first node reports, to the second node, the third guard interval information associated with the first timing mode of the MT, where the third guard interval information includes the fifth symbol quantity and the sixth symbol quantity, the fifth symbol quantity indicates a quantity of guard symbols for switching from the DU resource to the MT resource, and the sixth symbol quantity indicates a quantity of guard symbols for switching from the MT resource to the DU resource.

Figure 14A:
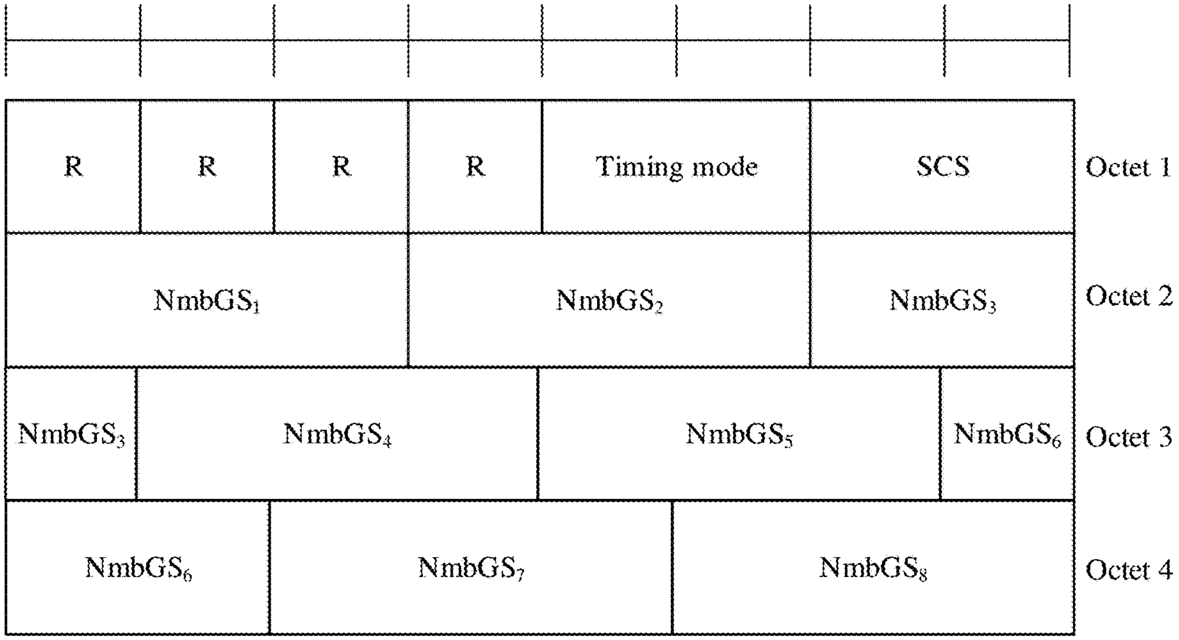
FIG. 14*a* is a schematic diagram of examples of formats of fields for quantities of guard symbols that are associated with timing modes and that are carried in MACs.
Figure 14B:
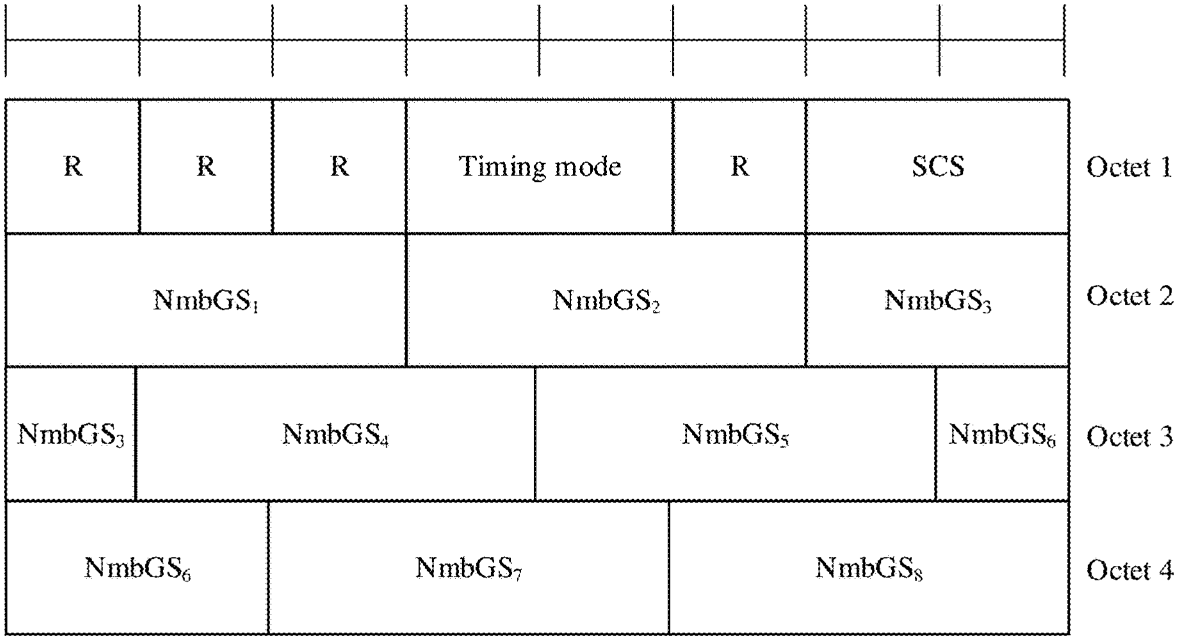
FIG. 14*b* is another schematic diagram of examples of formats of fields for quantities of guard symbols that are associated with timing modes and that are carried in MACs.

For example, when the first node reports, to the second node, the guard interval information associated with the timing mode of the MT, or the second node configures, for the first node, the guard interval information associated with the timing mode, the third guard interval information may be carried in a MAC CE shown in FIG. 14*a* or FIG. 14*b*. The MAC CE has six reserved bits, and the timing mode associated with the guard interval information carried in the MAC CE may be indicated by using some of the six bits. The timing mode may be indicated by using any quantity of bits of the six reserved bits, for example, the first two bits of the six reserved bits, the last two bits of the six reserved bits shown in FIG. 14*a*, or the middle two bits of the six reserved bits shown in FIG. 14*b*. Certainly, the timing mode may not necessarily be indicated by using two bits. As shown in table 9, guard interval information associated with different timing modes is indicated by using two reserved bits.

TABLE 9

| Bit value | Timing mode |
|---|---|
| 00 | Timing mode 1 |
| 01 | Timing mode 6 |
| 10 | Timing mode x |
| 11 | Timing mode y |

A bit value of "00" indicates the timing mode 1, and a bit value of "01" indicates the timing mode 6. If there are other timing modes, for example, the timing mode x and the timing mode y, different bit values may indicate different timing modes based on a correspondence that is between a bit value and a timing mode and is shown in table 2. Certainly, the correspondence between a bit value and a timing mode is not limited to that shown in table 2, and there may be another correspondence. For example, the bit value of "00" indicates the timing mode 6, and the bit value of "01" indicates the timing mode 1.

If there are more timing modes, the guard interval information associated with the different timing modes may be further indicated by using more reserved bits.

For example, if a value of a reserved bit in the MAC CE is "00", it indicates that a timing mode is the timing mode 1, and eight quantities of guard symbols carried in the MAC CE are the third guard interval information associated with the timing mode 1, namely, $NmbGS_1$ to $NmbGS_8$. After receiving the MAC CE, the second node may learn, based on the value "00" of the reserved bit in the MAC CE, that the eight quantities of guard symbols carried in the MAC CE are the third guard interval information associated with the timing mode 1.

S202: The first node reports, to the second node, fourth guard interval information associated with the second timing mode of the MT.

Accordingly, the second node receives the fourth guard interval information associated with the second timing mode of the MT.

Before this step, the first node determines that the start symbol of the MT resource located after the DU resource is located after the end symbol of the DU resource, and the end symbol of the DU resource and the start symbol of the MT resource are separated by N2 symbols, where N2 is a seventh symbol quantity. The first node determines that the end symbol of the MT resource located before the DU resource is located before the start symbol of the DU resource, and the end symbol of the MT resource and the start symbol of the DU resource are separated by M2 symbols, where M2 is an eighth symbol quantity.

In this step, the first node reports, to the second node, the fourth guard interval information associated with the second timing mode of the MT, where the fourth guard interval information includes the seventh symbol quantity and the eighth symbol quantity, the seventh symbol quantity indicates a quantity of guard symbols for switching from the DU resource to the MT resource, and the eighth symbol quantity indicates a quantity of guard symbols for switching from the MT resource to the DU resource.

Similarly, the first node may include the fourth guard interval information in the MAC CE shown in FIG. 8. As shown in table 2, if a value of a reserved bit in the MAC CE is "01", it indicates that a timing mode is the timing mode 6, and eight quantities of guard symbols carried in the MAC CE are the fourth guard interval information associated with the timing mode 6, namely, $NmbGS_1$ to $NmbGS_8$. After receiving the MAC CE, the second node may learn, based on the value "01" of the reserved bit in the MAC CE, that the eight quantities of guard symbols carried in the MAC CE are the fourth guard interval information associated with the timing mode 6.

Further, it is assumed that the quantities of guard symbols that are associated with the timing mode 1 and that are reported by the first node are included in a first reporting quantity, and the quantities of guard symbols associated with the timing mode 6 are included in a second reporting quantity. If the first reporting quantity or the second reporting quantity is carried in the MAC CE, both the first reporting quantity and the second reporting quantity that are successively sent by the first node include a quantity of guard symbols related to downlink sending of the MT. In this embodiment, a downlink timing mode of the MT does not change. Therefore, quantities of guard symbols related to downlink transmission of the MT in two times of reporting may be equal. For example, the first reporting quantity includes $NmbGS_1$ to $NmbGS_8$, where $NmbGS_1$ to $NmbGS_4$ are quantities of guard symbols associated with the MT UL Tx and the timing mode 1, and $NmbGS_5$ to $NmbGS_8$ are quantities of guard symbols associated with the MT DL Rx. The second reporting quantity includes $NmbGS_9$ to $NmbGS_{16}$, where $NmbGS_9$ to $NmbGS_{12}$ are quantities of guard symbols associated with the MT UL Tx and the timing mode 6, and $NmbGS_{13}$ to $NmbGS_{16}$ are quantities of guard symbols associated with the MT DL Rx. In the two reporting processes, $NmbGS_5$ to $NmbGS_8$ are equal to $NmbGS_{13}$ to $NmbGS_{16}$.

In some scenarios, the MT may update a guard symbol value. Therefore, the second node may consider that a quantity of guard symbols related to downlink receiving of the MT is a reporting quantity that is reported for the second time in the two times of reporting. That is, in the foregoing example, the quantities of guard symbols related to the MT DL Rx are $NmbGS_{13}$ to $NmbGS_{16}$ that are reported for the second time. The quantities of guard symbols related to the MT DL Rx include $NmbGS_5$ to $NmbGS_8$ that are reported for the first time.

S203: The second node sends first configuration information to the first node, where the first configuration information includes first guard interval information associated with the first timing mode of the MT.

Accordingly, the first node receives the first configuration information.

After receiving the first guard interval information reported by the first node, the second node may configure the first guard interval information based on all, some, or none of the reported first guard interval information.

The first guard interval information includes a first symbol quantity and a second symbol quantity, where the first symbol quantity indicates a quantity of guard symbols for switching from the DU resource to the MT resource, and the second symbol quantity indicates a quantity of guard symbols for switching from the MT resource to the DU resource.

Similarly, the second node may include the first configuration information in the MAC CE shown in FIG. 8. As shown in table 2, if a value of a reserved bit in the MAC CE is "00", it indicates that a timing mode is the timing mode 1, and eight quantities of guard symbols carried in the MAC CE are the first guard interval information associated with the timing mode 1, namely, $NmbGS_1$ to $NmbGS_8$. After receiving the MAC CE, the first node may learn, based on the value "00" of the reserved bit in the MAC CE, that the eight quantities of guard symbols carried in the MAC CE are the first guard interval information associated with the timing mode 1.

S204: The second node sends second configuration information to the first node, where the second configuration information includes second guard interval information associated with the second timing mode of the MT.

Accordingly, the first node receives the second configuration information.

After receiving the fourth guard interval information reported by the first node, the second node may configure the second guard interval information based on all, some, or none of the reported fourth guard interval information.

The second guard interval information includes a third symbol quantity and a fourth symbol quantity, where the third symbol quantity indicates a quantity of guard symbols for switching from the DU resource to the MT resource, and the fourth symbol quantity indicates a quantity of guard symbols for switching from the MT resource to the DU resource.

Similarly, the second node may include the second configuration information in the MAC CE shown in FIG. 8. As shown in table 2, if a value of a reserved bit in the MAC CE is "01", it indicates that a timing mode is the timing mode 6, and eight quantities of guard symbols carried in the MAC CE are the second interval information associated with the timing mode 6, namely, $NmbGS_1$ to $NmbGS_8$. After receiving the MAC CE, the first node may learn, based on the value "01" of the reserved bit in the MAC CE, that the eight quantities of guard symbols carried in the MAC CE are the second guard interval information associated with the timing mode 6.

S205: The first node reports a timing difference between the first timing mode and the second timing mode to the second node.

Accordingly, the second node receives the timing difference.

As described above, there is the timing difference between the timing mode 1 and the timing mode 6, and the difference is Tm=Tp+Tg. Because timing is not an ideal factor, the second node cannot accurately obtain the timing difference. The first node may accurately determine the timing difference. Therefore, the first node may report, to the second node, a timing difference between uplink sending of the MT of the first node in the timing mode 1 and uplink sending of the MT in the timing mode 6, which is alternatively referred as a timing difference between uplink sending of the MT in the timing mode 1 and downlink sending of the DU. After obtaining the timing difference, the second node may more accurately determine receive window timing that needs to be used by the second node when the DU of the first node performs uplink transmission in the timing mode 6, to improve a received signal-to-noise ratio.

S206: When a timing mode of the first node is the first timing mode, the first node determines a time domain position of the MT resource based on a time domain position of the DU resource and the first guard interval information. Alternatively, when a timing mode of the first node is the second timing mode, the first node determines a time domain position of the MT resource based on a time domain position of the DU resource and the second guard interval information.

After the first node receives the first guard interval information associated with the first timing mode, if the second node configures the first node to use the timing mode 1 currently, the first node determines the time domain position of the MT resource based on the time domain position of the DU resource and the first guard interval information. Specifically, a specific quantity of guard symbols is determined based on the first guard interval information and a switching scenario. For example, if a DU operation of the first node is switched to an MT operation, it is determined that the start symbol of the MT resource located after the DU resource is located after the end symbol of the DU resource, and the end symbol of the DU resource and the start symbol of the MT resource are separated by the N1 symbols, where N1 is the first symbol quantity. If the MT operation of the first node is switched to the DU operation, it is determined that the end symbol of the MT resource located before the DU resource is located before the start symbol of the DU resource and, the end symbol of the MT resource and the start symbol of the DU resource are separated by the M1 symbols, where M1 is the second symbol quantity.

After the first node receives the second guard interval information associated with the second timing mode, if the second node configures the first node to use the timing mode 6 currently, the first node determines the time domain position of the MT resource based on the time domain position of the DU resource and the second guard interval information. Specifically, a specific quantity of guard symbols is determined based on the second guard interval information and a switching scenario. For example, if the DU operation of the first node is switched to the MT operation, it is determined that the start symbol of the MT resource located after the DU resource is located after the end symbol of the DU resource, and the end symbol of the DU resource and the start symbol of the MT resource are separated by the N2 symbols, where N2 is the third symbol quantity. If the MT operation of the first node is switched to the DU operation, it is determined that the end symbol of the MT resource located before the DU resource is located before the start symbol of the DU resource and, the end symbol of the MT resource and the start symbol of the DU resource are separated by the M2 symbols, where M2 is the fourth symbol quantity.

S207: When the second node configures the first node to use a third timing mode, the first node reports, to the second node, fifth guard interval information associated with the third timing mode.

When the second node configures the first node to use the new third timing mode, if the first node has not reported, to the second node, the fifth guard interval information associated with the third timing mode, the first node may report, to the second node, the fifth guard interval information associated with the third timing mode. Therefore, the second node may configure, based on all, some, or none of the fifth guard interval information, the guard interval information associated with the third timing mode.

Value ranges of the first symbol quantity to the eighth symbol quantity may be consistent with those in an existing protocol, in other words, the value ranges are [0,4], and the first symbol quantity to the eighth symbol quantity are all integers. The value ranges of the first symbol quantity to the eighth symbol quantity may alternatively be other ranges. For example, a negative quantity of guard symbols or a larger quantity of guard symbols may be introduced.

According to the resource multiplexing method provided in this embodiment, the guard interval information configured by the second node is associated with the different timing modes, so that the first node can obtain the guard interval information corresponding to the different timing modes, to improve flexibility of resource multiplexing performed on an access link and a backhaul link.

Figure 15:
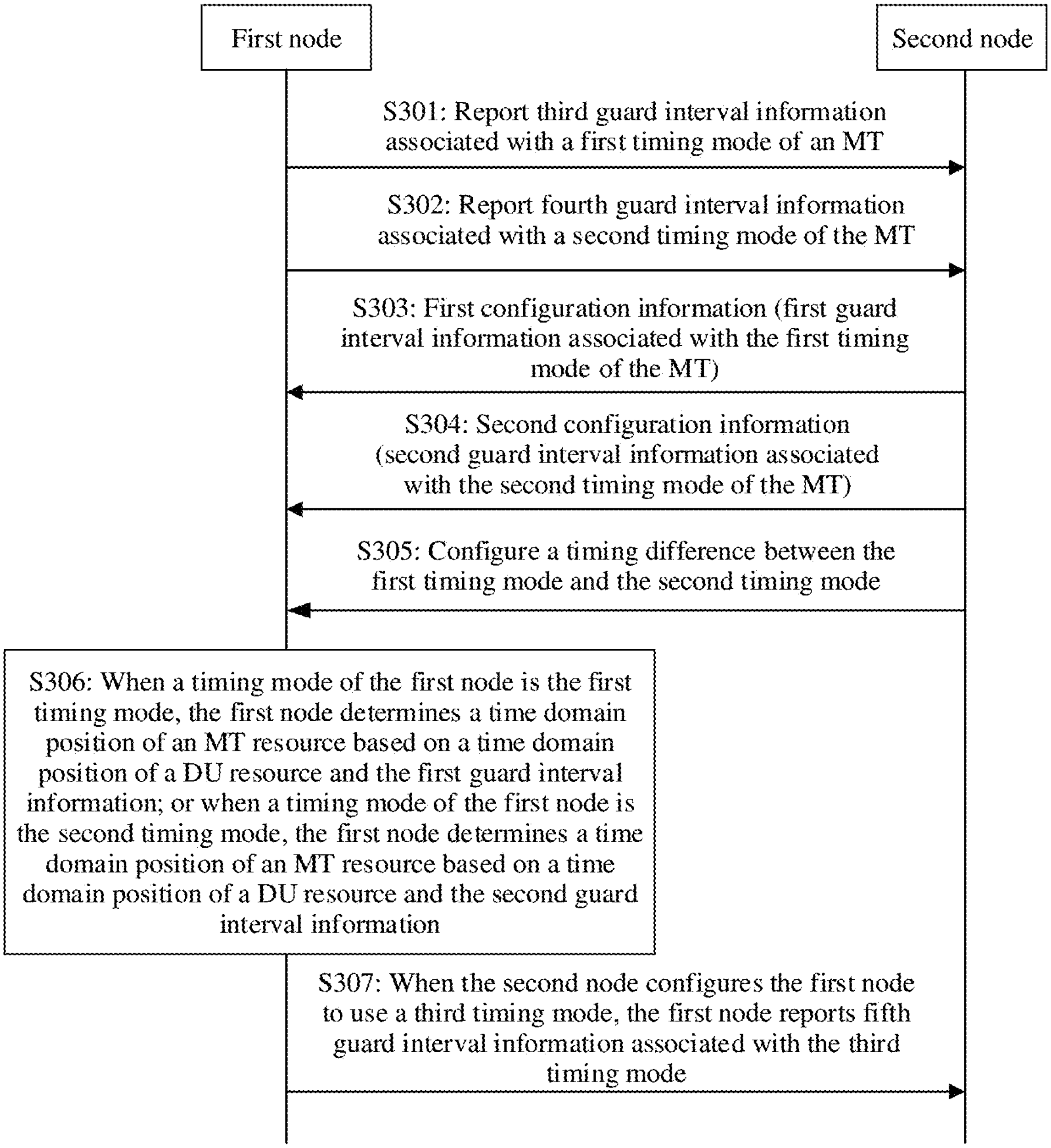
FIG. 15 is a schematic flowchart of still another resource multiplexing method according to an embodiment of this application.

FIG. 15 is a schematic flowchart of still another resource multiplexing method according to an embodiment of this application. A procedure is similar to that shown in FIG. 11.

Only differences between the embodiment shown in FIG. 15 and the embodiment shown in FIG. 11 are described herein. For other similar parts, refer to text descriptions in FIG. 11. In this embodiment, the first timing mode is a timing mode 1, and the second timing mode is a timing mode 7. To support the foregoing resource multiplexing type 2, namely, simultaneous receiving of the MT and the DU, which is alternatively referred to as receive space division multiplexing (No TDM for MT-RX/DU-RX), the timing mode 7 is introduced in this embodiment. Refer to the schematic diagram of the principles of the timing mode 1 and the timing mode 7 in FIG. 16. When the first node uses the timing mode 7, the first node may implement timing alignment when simultaneously receiving a downlink signal of an MT (MT DL Rx) and an uplink signal of a DU (DU UL Rx) (as shown in schematic diagrams of slots in the first row and the second row in FIG. 16). Specifically, symbol-level alignment (staggering by one symbol) is implemented between the MT DL Rx and the DU UL Rx. In other words, timing alignment is implemented between an uplink receive symbol 1 of the DU and a downlink receive symbol 0 of the MT. Receive timing alignment enables the first node to perform low-complexity joint signal processing of the MT and the DU, and improves receiving performance of the MT and the DU.

Figure 16:
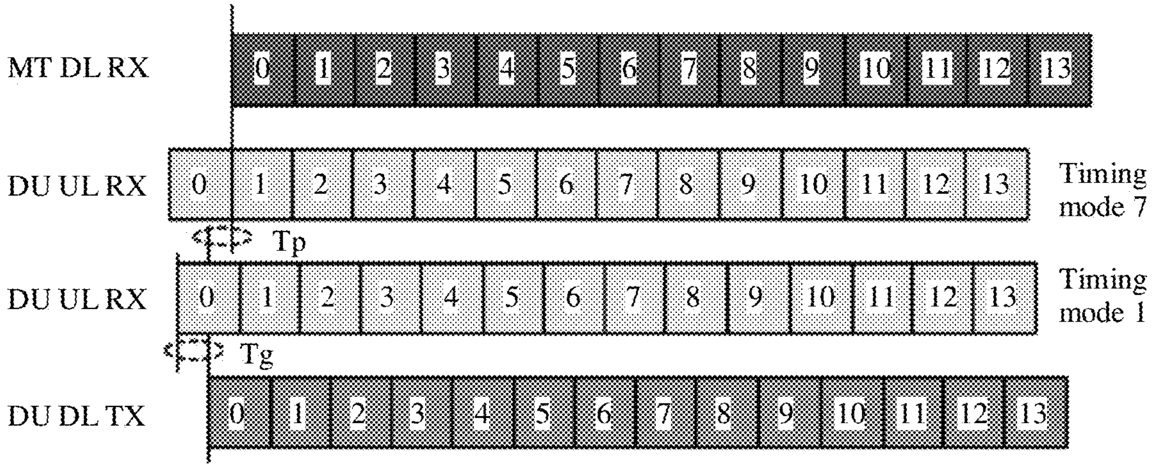
FIG. 16 is a schematic diagram of principles of a timing mode 1 and a timing mode 7.

Still refer to schematic diagrams of slots in the first row and the fourth row in FIG. 16. There is a time difference Tp between downlink sending of the DU of the second node and downlink receiving of the MT of the first node. Refer to schematic diagrams of slots in the third row and the fourth row in FIG. 16. There is a timing difference Tg between an uplink receive frame and a downlink transmit frame of the DU of the second node.

Figure 17:
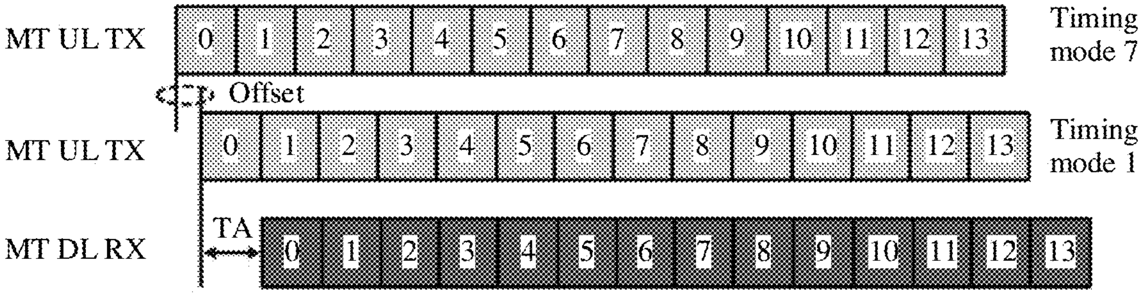
FIG. 17 is a schematic diagram of a timing difference between a timing mode 1 and a timing mode 7.

Therefore, as shown in FIG. 17, there is a timing difference between the timing mode 7 and the timing mode 1, and there is an offset of one TA 1 between an uplink transmit frame and a downlink receive frame of the MT in the timing mode 1. There is the timing difference between the timing mode 7 and the timing mode 1. The timing difference may be a sum of the TA 1 and a first offset value. Alternatively, the timing difference may be a TA 2, and the TA 2 may be different from the TA 1.

In step S305 shown in FIG. 15, the first offset value or the TA 2 may be configured by the second node. Optionally, alternatively, the first offset value or the TA 2 may be determined by the first node, and reported to the second node.

In the foregoing embodiment, the described timing mode 1, timing mode 6, and timing mode 7 are all related to uplink timing of the MT. In addition, a timing mode related to downlink timing may be further included. For example, it is assumed that a basic timing mode related to the downlink timing is a timing mode A, and the downlink timing is downlink receive timing determined by an MT of an IAB node based on a synchronization/physical broadcast signal (SS/PBCH) block or a channel state information-reference signal (CSI-RS). Currently, a new timing mode B is introduced. The MT of the IAB node may determine downlink receive timing based on a timing difference configured by a parent node or a reference signal. The timing difference is an offset between the timing mode B and the timing mode A. When the MT of the IAB node has a plurality of downlink timing modes, the IAB node may report guard interval information associated with different downlink timing modes, and the parent node may configure the guard interval information associated with the different downlink timing modes. For a process of the reporting and configuration, refer to related descriptions in the embodiment of an uplink timing mode.

In the foregoing embodiments, guard interval information is grouped based on different associated timing modes. In the following embodiment, another guard symbol grouping manner is considered.

Figure 18:
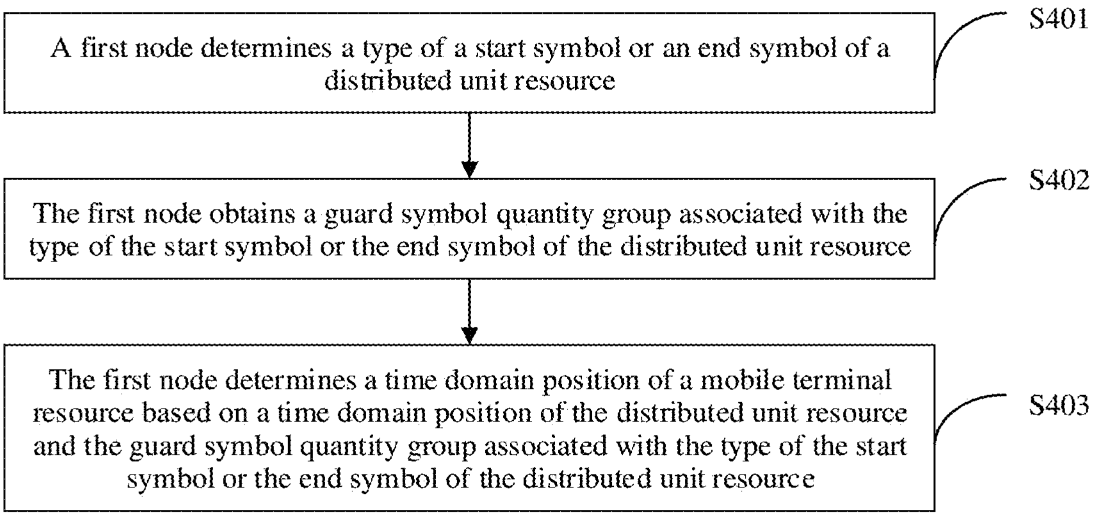
FIG. 18 is a schematic flowchart of yet another resource multiplexing method according to an embodiment of this application.

FIG. 18 is a schematic flowchart of yet another resource multiplexing method according to an embodiment of this application. For example, the method may include the following steps.

S401: A first node determines a type of a start symbol or an end symbol of a DU resource, where an end symbol of an MT resource is located before the start symbol of the DU resource, or a start symbol of an MT resource is located after the end symbol of the DU resource.

The first node may be a communication device, or may be a donor node or a parent node of the communication device.

A quantity of guard symbols of an MT may be determined based on a type of the DU resource or a type of a symbol on a boundary of the DU resource, to determine a time domain position of the MT resource. In a scenario in which a DU operation is switched to an MT operation, the symbol on the boundary of the DU resource is the end symbol of the DU resource. In this case, the start symbol of the MT resource is located after the end symbol of the DU resource. In a scenario in which the MT operation is switched to the DU operation, the symbol on the boundary of the DU resource is the start symbol of the DU resource. In this case, the end symbol of the MT resource is located before the start symbol of the DU resource.

The start symbol or the end symbol of the DU resource includes the following types shown in table 10:

TABLE 10

| Sequence number | Type |
|---|---|
| 1 | Symbol on a boundary of a DU hard resource |
| 2 | Symbol on a boundary of a DU soft resource indicated as available |
| 3 | Symbol on a boundary of a resource that is occupied by a special signal or channel and converted into a DU hard resource |
| 4 | Symbol on a boundary of a DU slot, for example, the 1$^{st}$ symbol or the last symbol in the slot |
| 5 | Symbol in a DU slot, for example, one of the 2$^{nd}$ symbol to the last but one symbol in the slot |
| 6 | symbol at a start position of a DU downlink slot |
| 7 | symbol at an end position of a DU downlink slot |
| 8 | symbol at a start position of a DU uplink slot |
| 9 | symbol at an end position of a DU uplink slot |

In the type 1 to the type 3, the type of the start symbol or the end symbol of the DU is the same as the type of the DU resource.

For the type 3, the special symbol includes any one or more of the following: an SS/PBCH, a random access channel (RACH), a periodic CSI-RS, a broadcast channel for sending system information (SI) type 1, a PDCCH corresponding to a broadcast channel for sending system information (SI) type 1 (SIB1-PDCCH), a symbol occupied by a search space corresponding to a SIB1-PDCCH, and a cell-level signal or channel.

The type of the start symbol or the end symbol of the DU resource is the symbol on the boundary of the DU slot. For example, the start symbol or the end symbol of the DU resource may be the 1$^{st}$ symbol or the last symbol of the slot. The type of the start symbol or the end symbol of the DU resource is the symbol in the DU slot. For example, the start symbol or the end symbol of the DU resource may be one of the $2^{nd}$ symbol to the last but one symbol of the slot. The type of the start symbol or the end symbol of the DU resource is the symbol at the start position of the DU downlink slot. In other words, the start symbol or the end symbol of the DU resource is located at the start position of the DU downlink slot. The type of the start symbol or the end symbol of the DU resource is the symbol at the end position of the DU downlink slot. In other words, the start symbol or the end symbol of the DU resource is located at the end position of the DU downlink slot. The type of the start symbol or the end symbol of the DU resource is the symbol at the start position of the DU uplink slot. In other words, the start symbol or the end symbol of the DU resource is located at the start position of the DU uplink slot. The type of the start symbol or the end symbol of the DU resource is the symbol at the end position of the DU uplink slot. In other words, the start symbol or the end symbol of the DU resource is located at the end position of the DU uplink slot.

S402: The first node obtains a guard symbol quantity group associated with the type of the start symbol or the end symbol of the DU resource.

Different types of start symbols or end symbols of DU resources are associated with different guard symbol quantity groups.

In this embodiment, an association relationship between the type of the start symbol or the end symbol of the DU resource and the guard symbol quantity group may be predefined.

For example, the types of the start symbols or the end symbols of the DU resources include the type 1 to the type 3. In an example, the association relationship between the type of the start symbol or the end symbol of the DU resource and the guard symbol quantity group may be shown in table 11.

TABLE 11

| Guard symbol quantity group | Type of a start symbol or an end symbol of a DU resource |
|---|---|
| Configured guard symbol quantity group | Types 1 and 2 |
| Reported guard symbol quantity group | Type 3 |

In a specific implementation, it is assumed that the first node is the communication device, and the first node reports a guard symbol quantity group to a parent node. The guard symbol quantity group includes one or more quantities of guard symbols. The first node may alternatively receive a guard symbol quantity group configured by a parent node. The first node stores an association relationship between a configured quantity of guard symbols, the reported guard symbol quantity group, and the type of the start symbol or the end symbol of the DU resource. Similarly, the parent node also stores the association relationship between the configured quantity of guard symbols, the reported guard symbol quantity group, and the type of the start symbol or the end symbol of the DU resource.

It is assumed that the first node is the parent node or the donor node of the communication device, and the first node receives a guard symbol quantity group reported by a child node. The first node alternatively configures a guard symbol quantity group for a child node. The first node stores an association relationship between a configured quantity of guard symbols, the reported guard symbol quantity group, and the type of the start symbol or the end symbol of the DU resource.

The guard symbol quantity group may be configured or reported via the MAC CE shown in FIG. 8. For a specific configuration or reporting manner, refer to descriptions in the foregoing embodiments.

In another example, the association relationship between the type of the start symbol or the end symbol of the DU resource and the guard symbol quantity group may be shown in table 12.

TABLE 12

| Guard symbol quantity group | Type of a start symbol or an end symbol of a DU resource |
|---|---|
| Preset guard symbol quantity group | Type 3 |
| Configured guard symbol quantity group | Types 1 and 2 |

The preset guard symbol quantity group may be a guard symbol quantity group predefined in a protocol, a guard symbol quantity group set before delivery, or the like.

Figure 19:
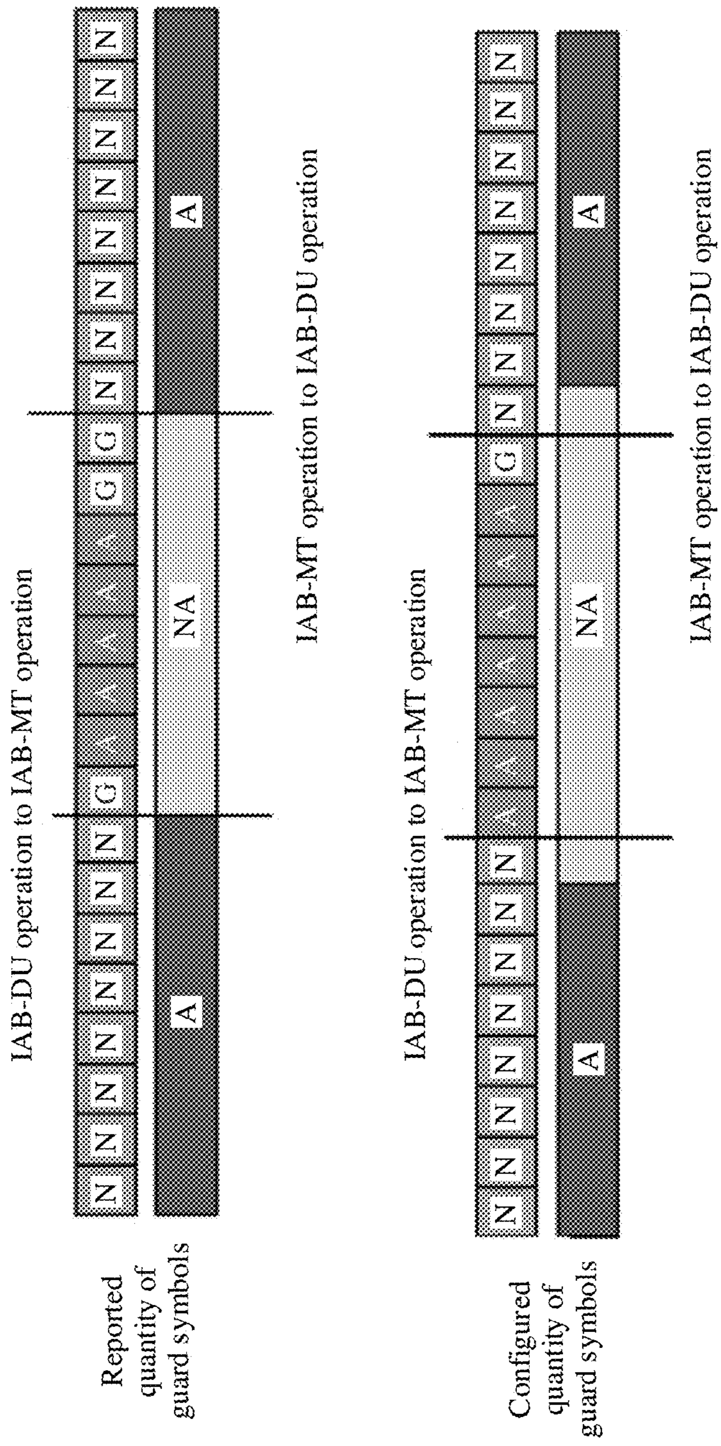
FIG. 19 is a schematic diagram of an example of an association relationship between a guard symbol quantity group and a type of a start symbol position or an end symbol of a DU resource.

In a scenario, for example, the type of the start symbol or the end symbol of the DU resource is the type 1 shown in table 3, namely, the symbol on the boundary of the DU hard resource. A guard symbol quantity group associated with the type 1 is the configured guard symbol quantity group. As shown in FIG. 19, the configured guard symbol quantity group is used. Regardless of whether the DU is switched to the MT or the MT is switched to the DU, available DU resources are reduced, and more available MT resources are provided. The MT resource is used for a backhaul link, to improve performance of the backhaul link.

In another scenario, the DU exchanges a cell-level signal with UE. For example, the type of the start symbol or the end symbol of the DU resource is the type 3 shown in table 3, namely, the symbol on the boundary of the resource that is occupied by the special signal or channel and converted into the DU hard resource. A guard symbol quantity group associated with the type 3 is the reported guard symbol quantity group. Still refer to FIG. 19. The reported guard symbol quantity group is used. Regardless of whether the DU is switched to the MT or the MT is switched to the DU, integrity of the DU resource is ensured, and available MT resources are reduced. In this way, smooth sending and receiving of cell-level signals are ensured.

The guard symbol quantity group includes a first symbol quantity and a second symbol quantity, where the first symbol quantity indicates a quantity of guard symbols for switching from the DU resource to the MT resource, and the second symbol quantity indicates a quantity of guard symbols for switching from the MT resource to the DU resource.

S403: The first node determines the time domain position of the MT resource based on a time domain position of the DU resource and the guard symbol quantity group associated with the type of the start symbol or the end symbol of the DU resource.

After determining the guard symbol quantity group, the first node may determine the time domain position of the MT resource based on the time domain position of the DU resource and the guard symbol of the MT.

According to the resource multiplexing method provided in this embodiment, the time domain position of the MT resource is determined based on the time domain position of the DU resource and the guard symbol quantity group associated with the type of the start symbol or the end symbol of the DU resource, so that time domain positions of MT resources corresponding to different types of start symbols or end symbols of DU resources can be accurately determined, to avoid a resource conflict between the backhaul link and an access link.

Figure 20:
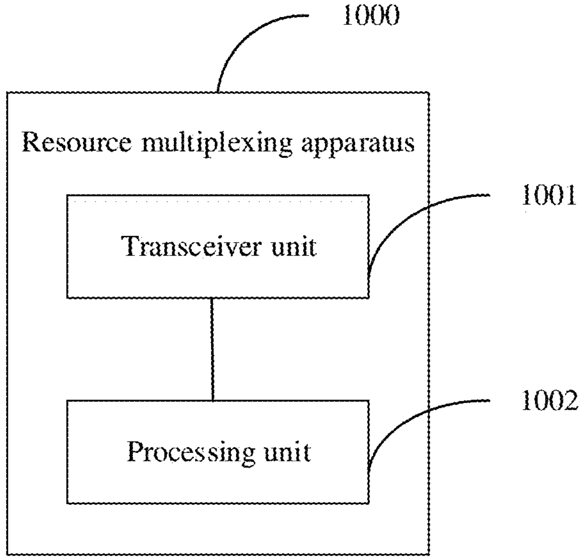
FIG. 20 is a schematic diagram of a structure of a resource multiplexing apparatus according to an embodiment of this application.

Based on a same concept as the foregoing resource multiplexing method, as shown in FIG. 20, an embodiment of this application further provides a resource multiplexing apparatus. The apparatus 1000 includes a transceiver unit 1001 and a processing unit 1002.

The transceiver unit 1001 is configured to receive first configuration information sent by a second node, where the first configuration information includes first guard interval information associated with a first timing mode of a mobile termination (MT), the first guard interval information includes a first symbol quantity and a second symbol quantity, the first symbol quantity indicates a quantity of guard symbols for switching from a distributed unit (DU) resource to an MT resource, the second symbol quantity indicates a quantity of guard symbols for switching from the MT resource to the DU resource, and a first node is a parent node or a donor node of the second node.

The transceiver unit 1001 is further configured to: receive second configuration information sent by the second node, where the second configuration information includes second guard interval information associated with a second timing mode of the MT, the second guard interval information includes a third symbol quantity and a fourth symbol quantity, the third symbol quantity indicates a quantity of guard symbols for switching from the DU resource to the MT resource, and the fourth symbol quantity indicates a quantity of guard symbols for switching from the MT resource to the DU resource.

In a design, the processing unit 1002 is configured to: when a timing mode of the first node is the first timing mode, determine a time domain position of the MT resource based on a time domain position of the DU resource and the first guard interval information; or the processing unit 1002 is configured to: when a timing mode of the first node is the second timing mode, determine a time domain position of the MT resource based on a time domain position of the DU resource and the second guard interval information.

In another design, the transceiver unit 1001 is further configured to report, to the second node, third guard interval information associated with the first timing mode of the MT, where the third guard interval information includes a fifth symbol quantity and a sixth symbol quantity, the fifth symbol quantity indicates a quantity of guard symbols for switching from the DU resource to the MT resource, and the sixth symbol quantity indicates a quantity of guard symbols for switching from the MT resource to the DU resource.

The transceiver unit 1001 is further configured to report, to the second node, fourth guard interval information associated with the second timing mode of the MT, where the fourth guard interval information includes a seventh symbol quantity and an eighth symbol quantity, the seventh symbol quantity indicates a quantity of guard symbols for switching from the DU resource to the MT resource, and the eighth symbol quantity indicates a quantity of guard symbols for switching from the MT resource to the DU resource.

In still another design, a value range of the first symbol quantity is [−3,4];

a value range of the second symbol quantity is [−3,4];
a value range of the third symbol quantity is [−3,4]; and
a value range of the fourth symbol quantity is [−3,4].

The value ranges of the first symbol quantity to the fourth symbol quantity are not limited to the foregoing value ranges, for example, may be [−2,4], [−1,4], or [−2,5].

The first symbol quantity, the second symbol quantity, the third symbol quantity, and the fourth symbol quantity are integers.

In still another design, a value range of the fifth symbol quantity is [−3,4];

a value range of the sixth symbol quantity is [−3,4];
a value range of the seventh symbol quantity is [−3,4]; and
a value range of the eighth symbol quantity is [−3,4].

The fifth symbol quantity, the sixth symbol quantity, the seventh symbol quantity, and the eighth symbol quantity are integers.

The value ranges of the fifth symbol quantity to the eighth symbol quantity are not limited to the foregoing value ranges, for example, may be [−2,4], [−1,4], or [−2,5].

In still another design, the first timing mode is a timing mode 1, and the second timing mode is a timing mode 6;

the first timing mode is a timing mode 1, and the second timing mode is a timing mode 7; or
the first timing mode is a timing mode 6, and the second timing mode is a timing mode 7.

In still another design, the transceiver unit 1001 is further configured to report a timing difference between the first timing mode and the second timing mode to the second node.

In still another design, the transceiver unit 1001 is further configured to receive a timing difference that is between the first timing mode and the second timing mode and is configured by the second node.

In still another design, the transceiver unit 1001 is further configured to: when the second node configures the first node to use a third timing mode, report, to the second node, fifth guard interval information associated with the third timing mode.

In still another design, the first symbol quantity includes a quantity of symbols by which a DU downlink symbol and an MT downlink symbol are separated, a quantity of symbols by which the DU downlink symbol and an MT uplink symbol are separated, a quantity of symbols by which a DU uplink symbol and the MT uplink symbol are separated, and a quantity of symbols by which the DU uplink symbol and the MT downlink symbol are separated.

The second symbol quantity includes a quantity of symbols by which the MT downlink symbol and the DU downlink symbol are separated, a quantity of symbols by which the MT downlink symbol and the DU uplink symbol are separated, a quantity of symbols by which the MT uplink symbol and the DU uplink symbol are separated, and a quantity of symbols by which the MT uplink symbol and the DU downlink symbol are separated.

In still another design, the processing unit 1002 is further configured to determine that a start symbol of the MT resource located after the DU resource is located after an end symbol of the DU resource, and the end symbol of the DU resource and the start symbol of the MT resource are separated by N symbols, where N is the first symbol quantity.

The processing unit 1002 is further configured to determine that an end symbol of the MT resource located before the DU resource is located before a start symbol of the DU resource, and the end symbol of the MT resource and the start symbol of the DU resource are separated by M symbols, where M is the second symbol quantity.

For specific implementations of the transceiver unit 1001 and the processing unit 1002, refer to related descriptions of the first node in the embodiments shown in FIG. 10, FIG. 11, and FIG. 15.

According to the resource multiplexing apparatus provided in this embodiment, guard interval information configured by the second node is associated with different timing modes, so that the resource multiplexing apparatus can obtain accurate guard interval information corresponding to the different timing modes, to improve flexibility of resource multiplexing performed on an access link and a backhaul link.

Figure 21:
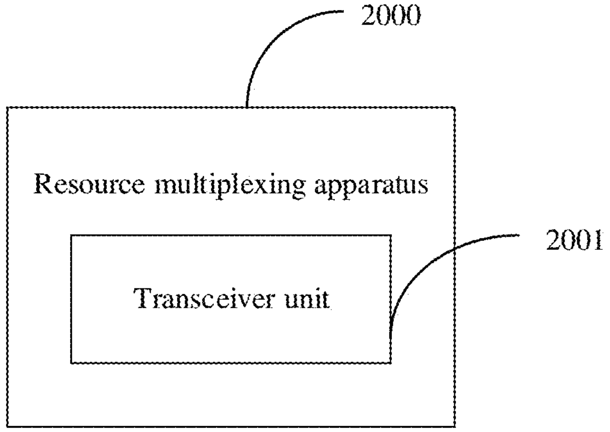
FIG. 21 is a schematic diagram of a structure of another resource multiplexing apparatus according to an embodiment of this application.

Based on a same concept as the foregoing resource multiplexing method, as shown in FIG. 21, an embodiment of this application further provides a resource multiplexing apparatus. The apparatus 2000 includes a transceiver unit 2001.

The transceiver unit 2001 is configured to send first configuration information to a first node, where the first configuration information includes first guard interval information associated with a first timing mode of a mobile termination (MT), the first guard interval information includes a first symbol quantity and a second symbol quantity, the first symbol quantity indicates a quantity of guard symbols for switching from a distributed unit (DU) resource to an MT resource, the second symbol quantity indicates a quantity of guard symbols for switching from the MT resource to the DU resource, and the first node is a parent node or a donor node of a second node.

The transceiver unit 2001 is further configured to send second configuration information to the first node, where the second configuration information includes second guard interval information associated with a second timing mode of the MT, the second guard interval information includes a third symbol quantity and a fourth symbol quantity, the third symbol quantity indicates a quantity of guard symbols for switching from the DU resource to the MT resource, and the fourth symbol quantity indicates a quantity of guard symbols for switching from the MT resource to the DU resource.

In a design, the transceiver unit 2001 is further configured to receive third guard interval information that is associated with the first timing mode of the MT and that is reported by the first node, where the third guard interval information includes a fifth symbol quantity and a sixth symbol quantity, the fifth symbol quantity indicates a quantity of guard symbols for switching from the DU resource to the MT resource, and the sixth symbol quantity indicates a quantity of guard symbols for switching from the MT resource to the DU resource.

The transceiver unit 2001 is further configured to receive fourth guard interval information that is associated with the second timing mode of the MT and that is reported by the first node, where the fourth guard interval information includes a seventh symbol quantity and an eighth symbol quantity, the seventh symbol quantity indicates a quantity of guard symbols for switching from the DU resource to the MT resource, and the eighth symbol quantity indicates a quantity of guard symbols for switching from the MT resource to the DU resource.

In another design, a value range of the first symbol quantity is [−3,4];

a value range of the second symbol quantity is [−3,4];
a value range of the third symbol quantity is [−3,4]; and
a value range of the fourth symbol quantity is [−3,4].

The first symbol quantity, the second symbol quantity, the third symbol quantity, and the fourth symbol quantity are integers.

The value ranges of the first symbol quantity to the fourth symbol quantity are not limited to the foregoing value ranges, for example, may be [−2,4], [−1,4], or [−2,5].

In still another design, a value range of the fifth symbol quantity is [−3,4];

a value range of the sixth symbol quantity is [−3,4];
a value range of the seventh symbol quantity is [−3,4]; and
a value range of the eighth symbol quantity is [−3,4].

The fifth symbol quantity, the sixth symbol quantity, the seventh symbol quantity, and the eighth symbol quantity are integers.

The value ranges of the fifth symbol quantity to the sixth symbol quantity are not limited to the foregoing value ranges, for example, may be [−2,4], [−1,4], or [−2,5].

In still another design, the first timing mode is a timing mode 1, and the second timing mode is a timing mode 6;

the first timing mode is a timing mode 1, and the second timing mode is a timing mode 7; or
the first timing mode is a timing mode 6, and the second timing mode is a timing mode 7.

In still another design, the transceiver unit 2001 is further configured to receive a timing difference that is between the first timing mode and the second timing mode and is reported by the first node.

In still another design, the transceiver unit 2001 is further configured to send a configured timing difference between the first timing mode and the second timing mode to the first node.

In still another design, the transceiver unit 2001 is further configured to: when the second node configures the first node to use a third timing mode, receive fifth guard interval information that is associated with the third timing mode and that is reported by the first node.

For specific implementations of the transceiver unit 2001, refer to related descriptions of the second node in the embodiments shown in FIG. 10, FIG. 11, and FIG. 15.

According to the resource multiplexing apparatus provided in this embodiment, guard interval information configured by the resource multiplexing apparatus is associated with different timing modes, so that the first node can obtain accurate guard interval information corresponding to the different timing modes, to improve flexibility of resource multiplexing performed on an access link and a backhaul link.

Figure 22:
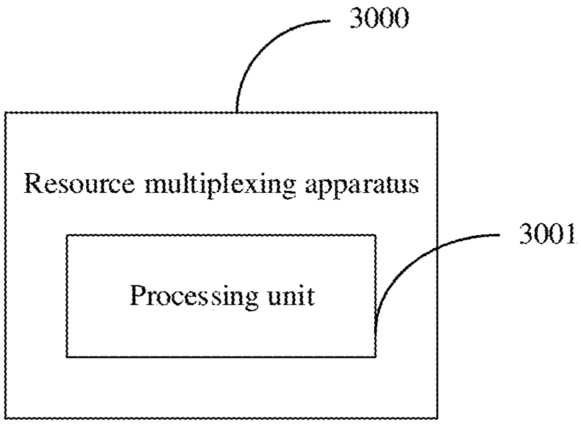
FIG. 22 is a schematic diagram of a structure of still another resource multiplexing apparatus according to an embodiment of this application.

Based on a same concept as the foregoing resource multiplexing method, as shown in FIG. 22, an embodiment of this application further provides a resource multiplexing apparatus. The apparatus 3000 includes a processing unit 3001.

The processing unit 3001 is configured to: determine a type of a start symbol position or an end symbol of a distributed unit DU resource, where an end symbol of a mobile termination (MT) resource is located before the start symbol of the DU resource, or a start symbol of an MT resource is located after the end symbol of the DU resource.

The processing unit 3001 is further configured to obtain a guard symbol quantity group associated with the type of the start symbol or the end symbol of the DU resource, where the guard symbol quantity group includes a first symbol quantity and a second symbol quantity, the first symbol quantity indicates a quantity of guard symbols for switching from the DU resource to the MT resource, and the second symbol quantity indicates a quantity of guard symbols for switching from the MT resource to the DU resource.

The processing unit 3001 is further configured to determine a time domain position of the MT resource based on a time domain position of the DU resource and the guard symbol quantity group associated with the type of the start symbol or the end symbol of the DU resource.

In a design, the end symbol of the DU resource includes the following types:

a symbol on a boundary of a DU hard resource, a symbol on a boundary of a DU soft resource indicated as available, a symbol on a boundary of a resource that is occupied by a special signal or channel and converted into a DU hard resource, a symbol on a boundary of a DU slot, a symbol in a DU slot, a symbol at a start position of a DU downlink slot, a symbol at an end position of a DU downlink slot, a symbol at a start position of a DU uplink slot, and a symbol at an end position of a DU uplink slot.

In another design, the start symbol of the DU resource includes the following types:

a symbol on a boundary of a DU hard resource, a symbol on a boundary of a DU soft resource indicated as available, a symbol on a boundary of a resource that is occupied by a special signal or channel and converted into a DU hard resource, a symbol on a boundary of a DU slot, a symbol in a DU slot, a symbol at a start position of a DU downlink slot, a symbol at an end position of a DU downlink slot, a symbol at a start position of a DU uplink slot, and a symbol at an end position of a DU uplink slot In still another design, the guard symbol quantity group includes one or more of the following groups:

a guard symbol quantity group reported by a first node and a guard symbol quantity group configured by a second node; or a guard symbol quantity group configured by a second node and a preset guard symbol quantity group.

For specific implementations of the processing unit 3001, refer to related descriptions of the first node in the embodiment shown in FIG. 18.

According to the resource multiplexing apparatus provided in this embodiment, the time domain position of the MT resource is determined based on the time domain position of the DU resource and the guard symbol quantity group associated with the type of the start symbol or the end symbol of the DU resource, so that time domain positions of MT resources corresponding to different types of start symbols or end symbols of DU resources can be accurately determined, to avoid a resource conflict between a backhaul link and an access link.

In the foregoing apparatus embodiments, module division is an example, and is merely logical function division. During actual implementation, another division manner may be used. In addition, function modules in embodiments of this application may be integrated into one processor, or each of the function modules may exist alone physically, or two or more modules may be integrated into one module. The integrated module may be implemented in a form of hardware, or may be implemented in a form of a software function module. It may be understood that, for functions or implementations of the modules in embodiments of this application, further refer to related descriptions in the method embodiments.

Figure 23:
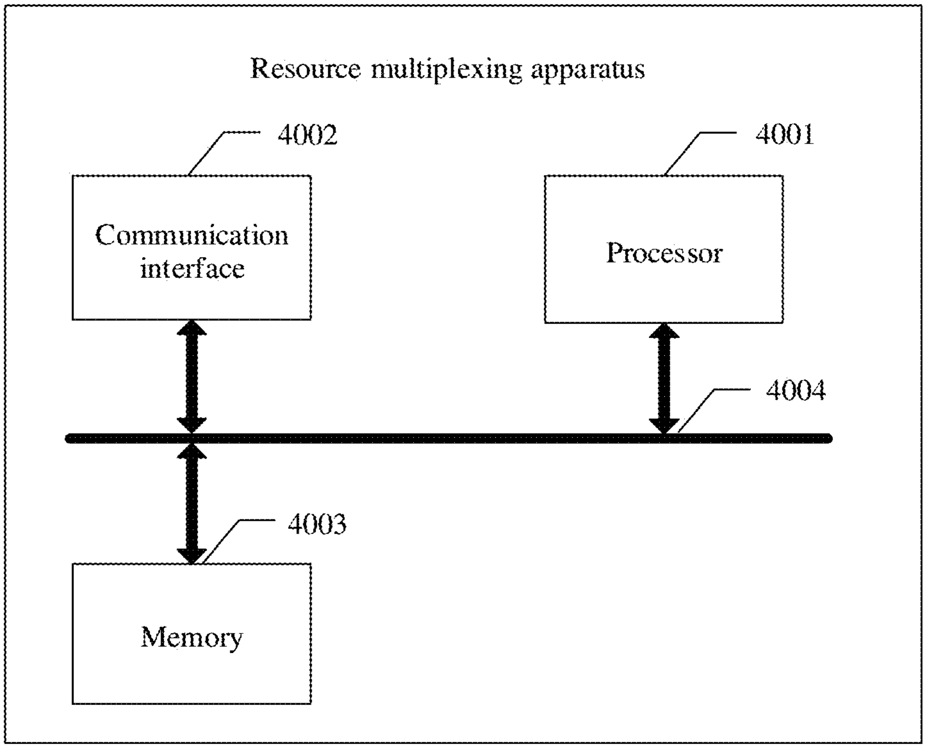
FIG. 23 is a schematic diagram of a structure of yet another resource multiplexing apparatus according to an embodiment of this application.

As shown in FIG. 23, an embodiment of this application further provides a resource multiplexing apparatus. The apparatus may be the first node or the chip in the first node in the embodiments shown in FIG. 10, FIG. 11, and FIG. 15, or may be the second node or the chip in the second node in the embodiments shown in FIG. 10, FIG. 11, and FIG. 15. The first node may be a communication device, and the second node may be a parent node or a donor node of the communication device. The apparatus may alternatively be the first node in the embodiment shown in FIG. 18. The first node may be a communication device, or may be a parent node or a donor node of a communication device. The apparatus may include a processor 4001, a communication interface 4002, and a memory 4003.

The processor 4001 may be a central processing unit (CPU), a digital processing unit, or the like. The communication interface 4002 may be a transceiver, an interface circuit such as a transceiver circuit, a transceiver chip, or the like. The apparatus further includes the memory 4003, configured to store a program to be executed by the processor 4001. The memory 4003 may be a nonvolatile memory, for example, a hard disk drive (HDD) or a solid-state drive (SSD), or may be a volatile memory, for example, a random access memory (RAM). The memory 4003 is any other medium that can be used to carry or store expected program code in a form of instructions or a data structure and that can be accessed by a computer, but is not limited thereto.

In an embodiment, the processor 4001 is configured to execute the program code stored in the memory 4003, and is specifically configured to perform an action of the processing unit 1002. Details are not described in this application again. The communication interface 4002 is specifically configured to perform an action of the transceiver unit 1001. Details are not described in this application again.

In another embodiment, the communication interface 4002 is specifically configured to perform an action of the transceiver unit 2001. Details are not described in this application again.

In still another embodiment, the processor 4001 is configured to execute the program code stored in the memory 4003, and is specifically configured to perform an action of the processing unit 3001. Details are not described in this application again.

In this embodiment, a specific connection medium between the communication interface 4002, the processor 4001, and the memory 4003 is not limited. In this embodiment, the memory 4003, the processor 4001, and the communication interface 4002 are connected through a bus 4004 in FIG. 23. The bus is represented by a thick line in FIG. 23. A connection manner between other components is schematically described, and is not limited thereto. The bus may be classified into an address bus, a data bus, a control bus, and the like. For ease of representation, only one thick line is used to represent the bus in FIG. 23, but this does not mean that there is only one bus or only one type of bus.

It should be noted that the foregoing units or one or more of the units may be implemented by using software, hardware, or a combination thereof. When any one of the units or the units is implemented by using the software, the software exists in a form of computer program instructions, and is stored in the memory. The processor may be configured to execute the program instructions and implement the foregoing method procedures. The processor may be built in a system on chip (SoC) or an ASIC, or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a dedicated logic operation.

When the foregoing units are implemented by using the hardware, the hardware may be any one or any combination of a central processing unit (CPU), a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface. The at least one processor is coupled to a memory through the interface. When the at least one processor executes a computer program or instructions in the memory, the method according to any one of the foregoing method embodiments is performed. Optionally, the chip system may include a chip, or may include a chip and another discrete component. This is not specifically limited in this embodiment of this application.

Optionally, an embodiment of this application further provides a computer-readable storage medium. The computer-readable storage medium stores a computer program. When the computer program is executed by a network device, the network device is enabled to perform the method according to any one of the foregoing method embodiments.

Optionally, an embodiment of this application further provides a computer-readable storage medium. The computer-readable storage medium stores a computer program. When the computer program is executed by a relay apparatus, the relay apparatus is enabled to perform the method according to any one of the foregoing method embodiments.

Optionally, an embodiment of this application further provides a computer program product including instructions. When the instructions are executed by a computer, a network device is enabled to perform the method according to any one of the foregoing method embodiments.

Optionally, an embodiment of this application further provides a computer program product including instructions. When the instructions are executed by a computer, a relay apparatus is enabled to perform the method according to any one of the foregoing method embodiments.

Optionally, an embodiment of this application further provides a communication system. The communication system includes the foregoing network device and relay apparatus.

It should be understood that unless otherwise specified, "/" in descriptions of this application indicates an "or" relationship between associated objects. For example, A/B may indicate A or B. A and B may be singular or plural. In addition, in the descriptions of this application, "a plurality of" means two or more than two. At least one of the following items (pieces) or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

All or some of the foregoing embodiments may be implemented by using software, hardware, firmware, or any combination thereof. When a software program is used to implement embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A resource multiplexing apparatus, comprising a transceiver, configured to:

receive first configuration information sent by a second node, wherein the first configuration information comprises first guard interval information associated with a first timing mode of a mobile termination (MT) of the second node, the first guard interval information comprises a first symbol quantity and a second symbol quantity, the first symbol quantity indicates a quantity of guard symbols for switching from a distributed unit (DU) resource, provided by a distributed unit (DU), to an MT resource, the second symbol quantity indicates a quantity of guard symbols for switching from the MT resource to the DU resource, the second node is a parent node or a donor node of the resource multiplexing apparatus, and each guard symbol is a symbol that is unavailable to the MT resource; and receive second configuration information sent by the second node, wherein the second configuration information comprises second guard interval information associated with a second timing mode of the MT, the second guard interval information comprises a third symbol quantity and a fourth symbol quantity, the third symbol quantity indicates a quantity of guard symbols for switching from the DU resource to the MT resource, and the fourth symbol quantity indicates a quantity of guard symbols for switching from the MT resource to the DU resource, wherein the first timing mode and the second timing mode are associated with respective guard interval information, each timing mode corresponding to a relative transmission timing relationship between uplink transmission timing of the MT and transmission timing of the DU, and the guard interval information defining respective quantities of guard symbols for different switching scenarios, between the DU resource and the MT resource, within its associated timing mode, wherein switching scenarios applicable under the first timing mode differ from switching scenarios applicable under the second timing mode, and wherein each timing mode is applied across a plurality of switching scenarios between the DU resource and the MT resource, the relative transmission timing relationship defines a relative time offset or alignment between an MT transmission and a DU transmission in a time domain, and the first timing mode and the second timing mode correspond to different respective time offsets or alignments.

2. The resource multiplexing apparatus according to claim 1, further comprising:

a processor, configured to: when a timing mode of the resource multiplexing apparatus is the first timing mode, determine a time domain position of the MT resource based on a time domain position of the DU resource and the first guard interval information; or when a timing mode of the resource multiplexing apparatus is the second timing mode, determine a time domain position of the MT resource based on a time domain position of the DU resource and the second guard interval information.

3. The resource multiplexing apparatus according to claim 1, wherein the transceiver is further configured to: report, to the second node, third guard interval information associated with the first timing mode of the MT, wherein the third guard interval information comprises a fifth symbol quantity and a sixth symbol quantity, the fifth symbol quantity indicates a quantity of guard symbols for switching from the DU resource to the MT resource, and the sixth symbol quantity indicates a quantity of guard symbols for switching from the MT resource to the DU resource; and report, to the second node, fourth guard interval information associated with the second timing mode of the MT, wherein the fourth guard interval information comprises a seventh symbol quantity and an eighth symbol quantity, the seventh symbol quantity indicates a quantity of guard symbols for switching from the DU resource to the MT resource, and the eighth symbol quantity indicates a quantity of guard symbols for switching from the MT resource to the DU resource.

4. The resource multiplexing apparatus according to claim 1, wherein, when a timing mode of the resource multiplexing apparatus is the second timing mode, and the second timing mode is timing mode 6, MT uplink sending of the resource multiplexing apparatus is aligned with DU downlink sending of the resource multiplexing apparatus in time domain.

5. The resource multiplexing apparatus according to claim 1, wherein when a timing mode of the resource multiplexing apparatus is the second timing mode, and the second timing mode is timing mode 6, switching scenarios for switching between the DU resource and the MT resource comprise: MT uplink transmission to DU downlink transmission (MT UL Tx to DU DL Tx), MT uplink transmission to DU uplink receiving (MT UL Tx to DU UL Rx), DU downlink transmission to MT uplink transmission (DU DL Tx to MT UL Tx) and DU uplink transmission to MT uplink transmission (DU UL Rx to MT UL Tx).

6. The resource multiplexing apparatus according to claim 1, wherein the first timing mode is a timing mode 1, and the second timing mode is a timing mode 6;

the first timing mode is a timing mode 1, and the second timing mode is a timing mode 7; or the first timing mode is a timing mode 6, and the second timing mode is a timing mode 7.

7. The resource multiplexing apparatus according to claim 1, wherein the transceiver is further configured to receive a timing difference that is between the first timing mode and the second timing mode and is configured by the second node.

8. The resource multiplexing apparatus according to claim 1, wherein the transceiver is further configured to: when the second node configures the resource multiplexing apparatus to use a third timing mode, report, to the second node, fifth guard interval information associated with the third timing mode.

9. The resource multiplexing apparatus according to claim 1, wherein the first symbol quantity comprises a quantity of symbols that separate a DU downlink symbol from an MT downlink symbol, a quantity of symbols that separate the DU downlink symbol from an MT uplink symbol, a quantity of symbols that separate a DU uplink symbol from the MT uplink symbol, and a quantity of symbols that separate the DU uplink symbol from the MT downlink symbol; and the second symbol quantity comprises a quantity of symbols that separate the MT downlink symbol from the DU downlink symbol, a quantity of symbols that separate the MT downlink symbol from the DU uplink symbol, a quantity of symbols that separate the MT uplink symbol from the DU uplink symbol, and a quantity of symbols that separate the MT uplink symbol from the DU downlink symbol.

10. The resource multiplexing apparatus according to claim 1, wherein the guard symbol is unavailable to the MT resource in a specific direction before and after the DU resource in the specific direction when transmission is performed on the DU resource.

11. The resource multiplexing apparatus according to claim 10, wherein the specific direction is downlink, uplink or flexible.

12. The resource multiplexing apparatus according to claim 1, wherein in the first timing mode, uplink transmit frame timing of an MT is earlier than downlink receive frame timing of the MT.

13. The resource multiplexing apparatus according to claim 1, wherein the resource multiplexing apparatus is an integrated access and backhaul (IAB) node, and, in the second timing mode, uplink sending of the MT of the IAB node and downlink sending of the DU that is co-located with the MT of the IAB node are aligned in time domain.

14. The resource multiplexing apparatus according to claim 1, wherein the first timing mode corresponds to a transmission timing relationship in which uplink transmission timing of the MT is earlier than downlink receive timing of the MT by a timing advance; and wherein the second timing mode corresponds to a transmission timing relationship in which uplink transmission timing of the MT is aligned with downlink transmission timing of the DU.

15. A resource multiplexing apparatus, comprising a transceiver, configured to: send first configuration information to a first node, wherein the first configuration information comprises first guard interval information associated with a first timing mode of a mobile termination (MT) of the resource multiplexing apparatus, the first guard interval information comprises a first symbol quantity and a second symbol quantity, the first symbol quantity indicates a quantity of guard symbols for switching from a distributed unit (DU) resource, provided by a distributed unit (DU), to an MT resource, the second symbol quantity indicates a quantity of guard symbols for switching from the MT resource to the DU resource, the resource multiplexing apparatus is a parent node or a donor node of the first node, and each guard symbol is a symbol that is unavailable to the MT resource; and send second configuration information to the first node, wherein the second configuration information comprises second guard interval information associated with a second timing mode of the MT, the second guard interval information comprises a third symbol quantity and a fourth symbol quantity, the third symbol quantity indicates a quantity of guard symbols for switching from the DU resource to the MT resource, and the fourth symbol quantity indicates a quantity of guard symbols for switching from the MT resource to the DU resource, wherein the first timing mode and the second timing mode are associated with respective guard interval information, each timing mode corresponding to a relative transmission timing relationship between uplink transmission timing of the MT and transmission timing of the DU, and the guard interval information defining respective quantities of guard symbols for different switching scenarios, between the DU resource and the MT resource, within its associated timing mode, and wherein switching scenarios applicable under the first timing mode differ from switching scenarios applicable under the second timing mode, and wherein each timing mode is applied across a plurality of switching scenarios between the DU resource and the MT resource, the relative transmission timing relationship defines a relative time offset or alignment between an MT transmission and a DU transmission in a time domain, and the first timing mode and the second timing mode correspond to different respective time offsets or alignments.

16. The resource multiplexing apparatus according to claim 15, wherein the transceiver is further configured to: receive third guard interval information that is associated with the first timing mode of the MT and is reported by the first node, wherein the third guard interval information comprises a fifth symbol quantity and a sixth symbol quantity, the fifth symbol quantity indicates a quantity of guard symbols for switching from the DU resource to the MT resource, and the sixth symbol quantity indicates a quantity of guard symbols for switching from the MT resource to the DU resource; and receive fourth guard interval information that is associated with the second timing mode of the MT and is reported by the first node, wherein the fourth guard interval information comprises a seventh symbol quantity and an eighth symbol quantity, the seventh symbol quantity indicates a quantity of guard symbols for switching from the DU resource to the MT resource, and the eighth symbol quantity indicates a quantity of guard symbols for switching from the MT resource to the DU resource.

17. The resource multiplexing apparatus according to claim 15, wherein when a timing mode of the first node is the second timing mode, and the second timing mode is timing mode 6, MT uplink sending of the first node is aligned with DU downlink sending of the first node in time domain.

18. The resource multiplexing apparatus according to claim 15, wherein when a timing mode of the first node is the second timing mode, and the second timing mode is timing mode 6, switching scenarios for switching between the DU resource and the MT resource include: MT uplink transmission to DU downlink transmission (MT UL Tx to DU DL Tx), MT uplink transmission to DU uplink receiving (MT UL Tx to DU UL Rx), DU downlink transmission to MT uplink transmission (DU DL Tx to MT UL Tx) and DU uplink transmission to MT uplink transmission (DU UL Rx to MT UL Tx).

19. The resource multiplexing apparatus according to claim 15, wherein the first timing mode is a timing mode 1, and the second timing mode is a timing mode 6;

the first timing mode is a timing mode 1, and the second timing mode is a timing mode 7; or the first timing mode is a timing mode 6, and the second timing mode is a timing mode 7.

20. The resource multiplexing apparatus according to claim 15, wherein the transceiver is further configured to send a configured timing difference between the first timing mode and the second timing mode to the first node.

21. The resource multiplexing apparatus according to claim 15, wherein the transceiver is further configured to: when the resource multiplexing apparatus configures the first node to use a third timing mode, receive fifth guard interval information that is associated with the third timing mode and is reported by the first node.

* * * * *